United States Patent [19]
Hitomi et al.

[11] Patent Number: 5,309,886
[45] Date of Patent: May 10, 1994

[54] SUPERCHARGED INTERNAL COMBUSTION ENGINE

[75] Inventors: Mitsuo Hitomi; Shunji Masuda; Toshihiko Hattori; Kenji Kashiyama; Junsou Sasaki; Noriyuki Iwata; Naoyuki Yamagata, all of Hiroshima, Japan

[73] Assignee: Mazda Motor Corporation, Hiroshima, Japan

[21] Appl. No.: 949,226

[22] Filed: Sep. 23, 1992

[30] Foreign Application Priority Data

| Sep. 26, 1991 | [JP] | Japan | 3-247219 |
| Sep. 26, 1991 | [JP] | Japan | 3-274597 |
| Sep. 27, 1991 | [JP] | Japan | 3-249422 |
| Jan. 14, 1992 | [JP] | Japan | 4-024476 |

[51] Int. Cl.⁵ .............................................. F02B 33/42
[52] U.S. Cl. ..................................... 123/570; 60/605.2
[58] Field of Search ....................... 123/568, 570, 571; 60/605.2

[56] References Cited

U.S. PATENT DOCUMENTS

| 4,279,235 | 7/1981 | Flaig et al. | 123/571 |
| 4,323,045 | 4/1982 | Yamashita | 123/570 |
| 4,399,774 | 8/1983 | Tsutsumi | 123/568 |
| 4,702,218 | 10/1987 | Yoshioka et al. | 60/605.2 |
| 4,722,315 | 2/1988 | Pickel | 123/568 |

Primary Examiner—Tony M. Argenbright
Assistant Examiner—M. Macy
Attorney, Agent, or Firm—Fish & Richardson

[57] ABSTRACT

The supercharged internal combustion engine is so adapted as to set the air-fuel ratio to become a lean air-fuel ratio which is leaner than stoichiometric and lean enough to maximize improvements in a rate of consumption of fuel, for example, to the A/F ratio of 16, when the supercharger exists in such a supercharging region as demonstrating its sufficient degree of supercharging capability. When the air-fuel ratio is made lean in the supercharging region, exhaust gases are recirculated into the intake system of the engine, in addition to a mixed fuel. Preferably, the exhaust gases having lower temperatures are recirculated at the time of a high load of the engine in the supercharging region, while the exhaust gases having higher temperatures are recirculated at the time of a low load of the engine therein.

35 Claims, 17 Drawing Sheets

SUPERCHARGED INTERNAL COMBUSTION ENGINE

BACKGROUND OF THE INVENTION

1. Field of the Invention

The present invention relates to a supercharged internal combustion engine for an automotive vehicle with a supercharger equipped in an intake system.

2. Description of the Related Art

As a supercharged internal combustion engine so arranged as to increase its power by supercharging intake air into the engine may present the problem that a thermal load within the engine becomes larger, it is proposed in Japanese Patent Laid-open Publication (kokai) No. 3-23,327 that an air-fuel ratio of a mixed fuel to be inhaled into the engine is made leaner than stoichiometric in a supercharging region where the supercharger can exhibit a sufficient degree of its supercharging capability, thereby improving a rate of fuel to be consumed while lowering the temperature within the engine, such as temperatures at valve bridge portions and so on.

It is apparent from FIG. 6, however, that improvements in the rate of consumption of the fuel, which can be achieved by making the air-fuel ratio of the mixed fuel leaner, can be fulfilled at the air-fuel ratio close to an A/F ratio of 15 and that even if the air-fuel ratio is further made leaner, additional improvements in the rate of consumption of the fuel cannot be expected too much. FIG. 6 shows the relationships of the rate of recirculation of the exhaust gases (EGR) and the air-fuel ratio with various factors, such as the temperatures at the valve bridge portion, the temperatures of exhaust gases, etc., in order to gain the same torque by the same engine under the same load. In FIG. 6, the exhaust gases having the temperature of approximately 100° C. were recirculated into the intake system of the engine.

It is found from the foregoing relationships that, even if the air-fuel ratio of the mixed fuel is made leaner than the A/F ratio of 15 in the supercharging region, the improvements to be achieved by such a leaner air-fuel ratio are restricted merely to a decrease in the temperature within the engine.

SUMMARY OF THE INVENTION

Therefore, the object of the present invention is to provide a supercharged internal combustion engine so adapted as to lower the temperature within the engine to an extent higher than the leaner air-fuel ratio of the mixed fuel, without suppressing the improvements in the rate of consumption of the fuel to be gained by making the air-fuel ratio leaner.

In order to achieve the aforesaid object, the present invention consists of a supercharged internal combustion engine for an automotive vehicle, which comprises: a supercharger for supercharging intake air into the engine; an EGR passage for recirculating a portion of exhaust gases discharged from the engine into an intake system of the engine; an EGR control valve for adjusting an amount of the exhaust gases to be recirculated from the EGR passage; an air-fuel ratio control means for controlling an air-fuel ratio of a mixed fuel to be supplied to the engine so as to be made a lean air-fuel ratio which is made leaner than a stoichiometric air-fuel ratio yet up to maximizing improvements in a rate of consumption of the fuel in a supercharging region in which the supercharger can achieve its supercharging capability to a sufficient extent; and an EGR control means for controlling the EGR control valve to recirculate the exhaust gases into the intake system at the time of the lean air-fuel ratio in the supercharging region.

As shown in FIG. 6, when the pressure is increased from 600 mmHg to 700 mmHg by supercharging intake air into the engine and the air-fuel ratio of the mixed fuel is made leaner from the A/F ratio of 15.1 to the A/F ratio of 16.2, the effect of the leaner air-fuel ratio on the rate of consumption of the fuel can be improved only to a slight extent and the reduction in the temperature within the engine can be improved only by approximately 3.5° C. On the other hand, when the pressure is increased from 600 mmHg to 700 mmHg and the rate of recirculation of the exhaust gases is increased from 5.5% to 13%, the improvements in the lowering of the temperature within the engine (i.e. the temperature at the valve bridge portions) can be attained by approximately 7° C. and this result is approximately twice the result achieved by making the air-fuel ratio leaner from the A/F ratio of 15.1 to the A/F ratio of 16.2. It can further be noted herein that the rate of lowering the temperature of the exhaust gases to be achieved by the leaner air-fuel ratio of the mixed fuel can be improved by approximately 30° C., while the temperature of the exhaust gases is lowered by approximately 40° C. by recirculating the exhaust gases into the intake system of the engine. In addition, as shown in FIG. 7, it can be understood that the effect to be achieved by the recirculation of the exhaust gases upon the reduction in the temperature of the exhaust gases is larger than that to be achieved by making the air-fuel ratio leaner. In FIG. 7, the solid line A indicates the rate of NOx in the exhaust gases when the exhaust gases are recirculated in the weight equal to a surplus amount of air needed for making the air-fuel ratio leaner, and the broken line B indicates the rate of NOx therein when no exhaust gases are recirculated. Further, in FIG. 7, the rate of the NOx is set to 1 when the A/F ratio is 16 and the results are given under the same load.

Hence, the arrangement of the present invention offers the advantages that the temperature within the engine can be lowered to an extent greater than by making the air-fuel ratio leaner and that the amount of the NOx within the exhaust gases can be lowered to a larger extent. In other words, the same degree of the temperature within the engine can be lowered by the exhaust gases in the amount smaller than the amount of the air required for making the air-fuel ratio leaner, so that, in this instance, the capacity of the supercharger can be made smaller than that of the supercharger needed for reducing the same degree of the temperature within the engine by making the air-fuel ratio leaner.

Other objects, features and advantages of the present invention will become apparent in the course of the description of the preferred embodiments, which follows, with reference to the accompanying drawings.

BRIEF DESCRIPTION OF THE DRAWINGS

FIGS. 14 to 18 relate to a preferred example of the supercharged internal combustion engine according to a second embodiment of the present invention; in which:

FIG. 14 is a sectional view showing an essential portion of the supercharged internal combustion engine;

FIG. 15 is a view when seen from line X15—X15 of FIG. 14;

FIG. 16 is a longitudinal partial sectional view taken along line X16—X16 of FIG. 14;

FIG. 17 is a schematic representation of an intake passage for describing a distribution of flow speeds of the intake air; and FIG. 18 is a schematic representation of the intake passage for describing the distribution of the flow speeds of the intake air.

FIGS. 19 to 21 relate to a third embodiment of the supercharged internal combustion engine according to the present invention; in which:

FIG. 19 is a front view showing an essential portion of a V-type engine according to the present invention;

FIG. 20 is a view when seen from line X20—X20 of FIG. 20; and

FIG. 21 is a view when seen from line X21—X21 of FIG. 19.

DETAILED DESCRIPTION OF THE PREFERRED EMBODIMENTS

The present invention will be described more in detail with reference to the accompanying drawings.

Structure of Engine

Figure 1:
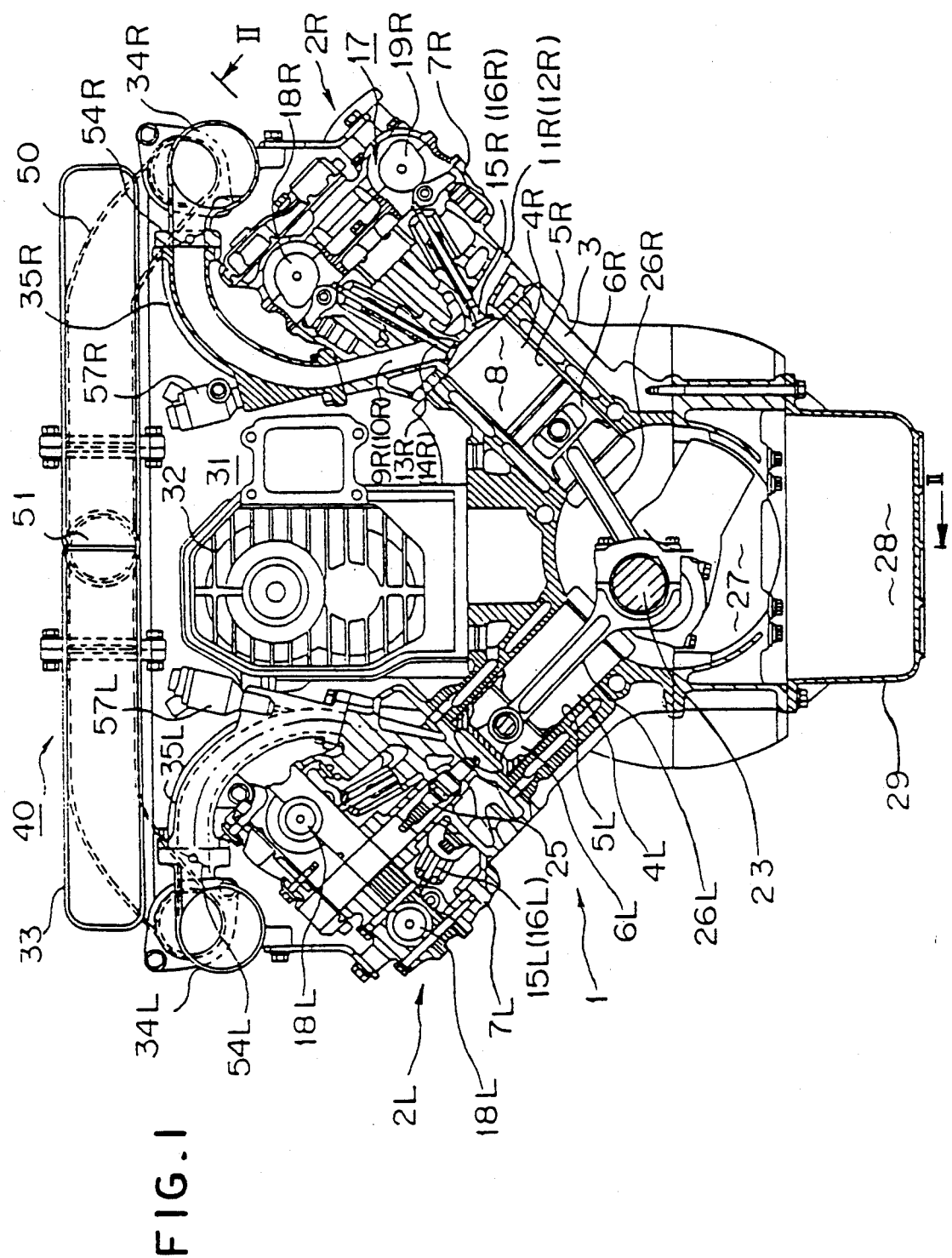
FIG. 1 is a longitudinal sectional view showing an first embodiment of a supercharged engine according to the present invention.
Figure 2:
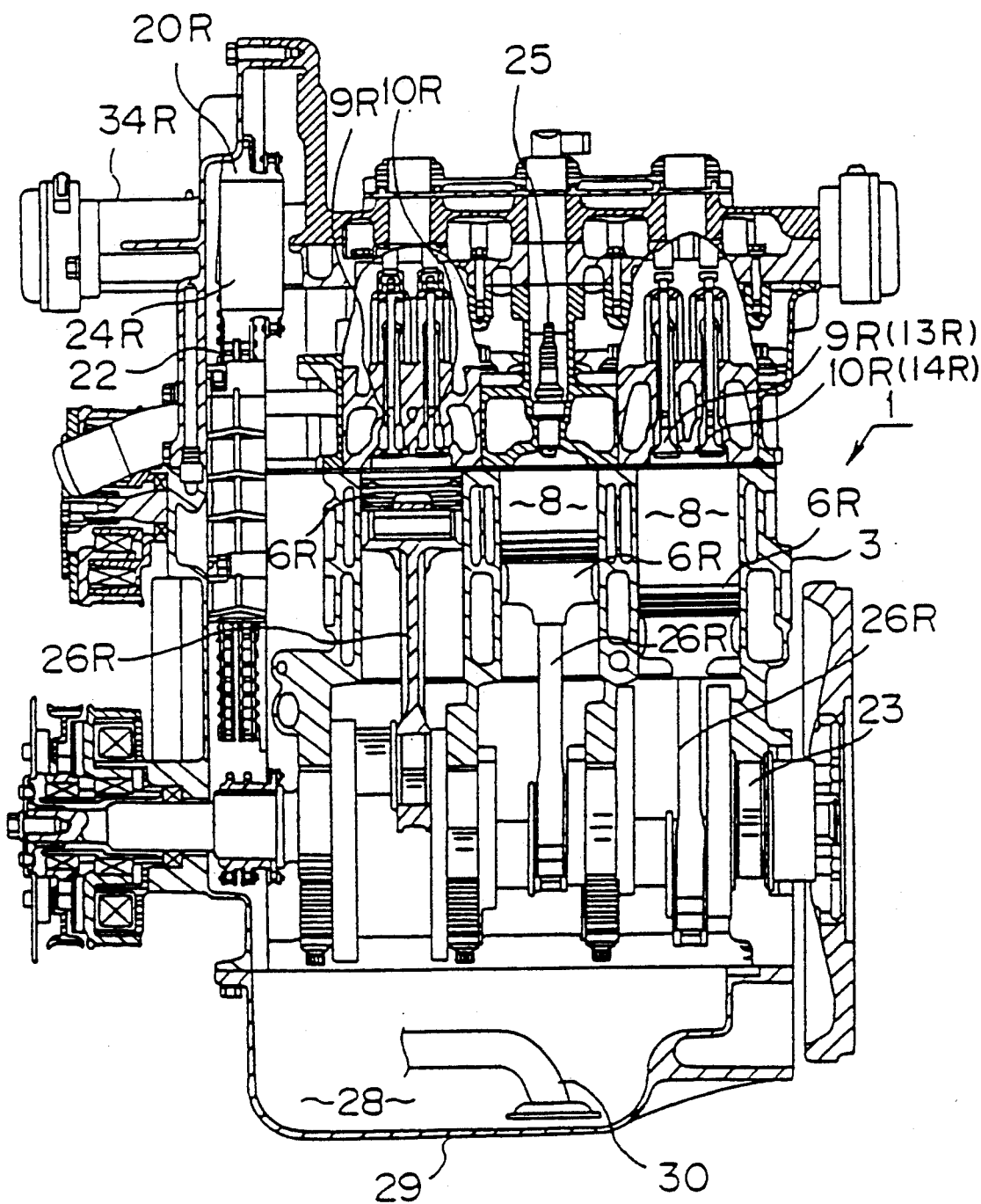
FIG. 2 is a sectional plan view taken along line II—II of FIG. 1.

As shown in FIGS. 1 and 2, an body 1 of the engine has a left-hand bank portion 2L and a right-hand bank portion 2R, which are arranged in a V-shaped relationship. Three cylinders, as collectively referred to as 4, are arranged in each of the left-hand and right-hand bank portions 2L and 2R in line with each of the bank portions. In other words, the internal combustion engine to be employed for the embodiment of the present invention is a so-called V-type 6-cylinder engine. In the description which follows, reference symbols "L" and "R" used as suffixes, as needed, are intended to mean "left-hand" and "right-hand", respectively.

A detailed description will be made of the body 1 of the engine. The body 1 of the engine has a cylinder block 3 and each of the cylinders 4 has a combustion chamber 8 of a penthouse type formed and delimited by a piston 6 inserted into a cylinder section 5 and a cylinder head 7. As specifically shown in FIG. 1, the cylinder head 7 is provided with first and second intake ports 9 and 10 as well as first and second exhaust ports 11 and 12, each having an opening at the combustion chamber 8. As further shown in FIG. 1, a first intake valve 13 is mounted to the first intake port 9 and a second intake valve 14 is mounted to the second intake port 10; and a first exhaust valve 15 is mounted to the first exhaust port 11 and a second exhaust valve 16 is mounted to the second exhaust port 12.

The body 1 of the engine to be employed in this embodiment of the present invention is a 4-valve type engine having two intake valves 13 and 14 and two exhaust valves 15 and 16 for each cylinder. A valve-operating system 17 for operatively opening and closing the valves 13-16 is of a so-called double overhead cam (DOHC) type, which has two camshafts 18 and 19 accommodated in the cylinder head 7. In other words, the first camshaft 18 is adapted to operatively open and close the intake valves 13 and 14, and the second camshaft 19 is adapted to operatively open and close the exhaust valves 15 and 16. As shown in FIG. 2, each of the first and second camshafts 18 and 19 is provided at its shaft end with a cam pulley 20 for the intake valve (although a cam pulley for the exhaust valve is not shown in the drawing). The cam pulley 20 is mechanically associated with an output shaft (a crankshaft) 23 of the engine through a timing belt 22, in a manner as is known to the art, thereby opening and closing the intake valves 13, 14 and the exhaust valves 15, 16 at a predetermined timing, in synchronization with the rotation of the output shaft 23 of the engine.

To the first camshaft 18 is mounted a first valve timing change-over mechanism 24 (for the intake valves) for changing a phase of the first camshaft 18 for the cam pulley 20 for the intake valves, and the second camshaft 19 is provided with a second valve timing change-over mechanism (for the exhaust valves) for changing a phase of the second camshaft 19 for the cam pulley for the exhaust valves, although not shown in the drawing. The second valve timing change-over mechanism for the exhaust valves has the same structure as the first valve timing change-over mechanism 24 for the intake valves so that a description of details of the second valve timing change-over mechanism will be omitted from the description which follows. To each of the cylinder heads 7 is mounted an ignition plug 25 so as to face or direct to the center of the combustion chamber 8.

The piston 6 is connected to the crankshaft 23 through a connecting rod 26, and a chamber 28 for reserving or storing engine oil is formed by an oil pan 29 in a region underneath a crank chamber 27 for accommodating the crankshaft 23. In FIG. 2, reference numeral 30 denotes an oil strainer.

In the middle space 31 interposed by the left-hand and right-hand bank portions 2L and 2R is mounted a supercharger 32 of a screw type which is mechanically driven by the force of rotation of the crankshaft 23, as shown in FIG. 1. Over the supercharger 32, there is disposed an intercooler 33. On the other hand, above each of the left-hand and right-hand bank portions 2L and 2R, there is disposed a surge tank 34 extending lengthwise along the crankshaft 23, and the surge tank 34 is connected to the intake ports 9 and 10 for each cylinder 4 through a discrete intake tube 35. As an upstream end of each of the intake ports 9 and 10 in the respective left-hand and right-hand bank portions 2L and 2R is disposed so as to open facing the middle space 31 interposed between the bank portions, the discrete intake tube 35 is arranged in such a shape as firstly extending transversely from the surge tank 34 toward the middle space 31 and then curving downward.

A detailed description will now be made of an intake system 40 for the body 1 of the engine with reference to FIG. 3.

The intake system 40 comprises a common intake tube 41, the left-hand surge tank 34L, the right-hand surge tank 34R, and the discrete intake tube 35, which are disposed in this order from the upstream side toward the downstream side. To the common intake tube 41 are disposed an air cleaner 42, an air flowmeter 43, and a throttle valve 44 in this order from the upstream side toward the downstream side. The common intake tube 41 has a first bypass 45 disposed so as to bypass the throttle valve 44 and a second bypass 46 so as to bypass the supercharger 32 of the screw type.

The first bypass 45 is provided with an ISC valve 47 which in turn can adjust the number of idling rotation in a manner as is known to the art. On the other hand, the second bypass 46 is provided with a relief valve 49 which is driven by an actuator 48 of a diaphragm type. The relief valve 49 is so arranged as to be opened when the pressure increased by supercharging the intake air becomes higher than a predetermined value, thereby opening the second bypass 46. On the other hand, the left-hand surge tank 34L is communicated with the right-hand surge tank 34R through a connecting tube 50 which in turn is provided in its intermediate position with a variable intake control valve 51 for variably controlling the amount of the intake air, for example, which may be opened and closed in accordance with the number of rotation of the engine, thereby achieving the dynamic effect of intake air over a wide region in a manner as is known to the art.

The discrete intake tube 35 is provided with a partition wall 35a to thereby divide its internal space partially into left-hand and right-hand sections, i.e. a first discrete intake tube 52 and a second discrete intake tube 53. The first discrete intake tube 52 is connected with the first intake port 9, and the second discrete intake tube 53 is connected with the second intake port 10. The second discrete intake tube 53 is so arranged as to be opened or closed with a shutter valve 54 mounted at its upstream end portion. Each of the shutter valves 54L disposed in the left-hand bank portion 2L is connected with a common shaft 55L for the left-hand bank portion 2L, and each of the shutter valves 54R disposed in the right-hand bank portion 2R is connected with a common shaft 55R for the right-hand bank portion 2R. To a shaft end of each of the common shafts 55L and 55R is mounted an actuator (not shown). Each of the shutter valves 54L and 54R is arranged so as to be closed in a low rotational region where the number of rotation of the engine is smaller than 3,000 rpm, on the one hand, and so as to be opened in a high rotational region where the number of rotation of the engine is higher than 3,000 rpm.

A fuel supply system of the body 1 of the engine comprises an upstream injector 56 and a downstream injector 57. The upstream injector 56 is mounted on the immediately upstream side of the supercharger 32 and the downstream injector 57 is mounted in the discrete intake tube 35 so as to face the first intake port 9 and the second intake port 10. In FIG. 3, reference numeral 58 denotes an assist air passage and reference numeral 59 denotes a check valve.

Figure 3:
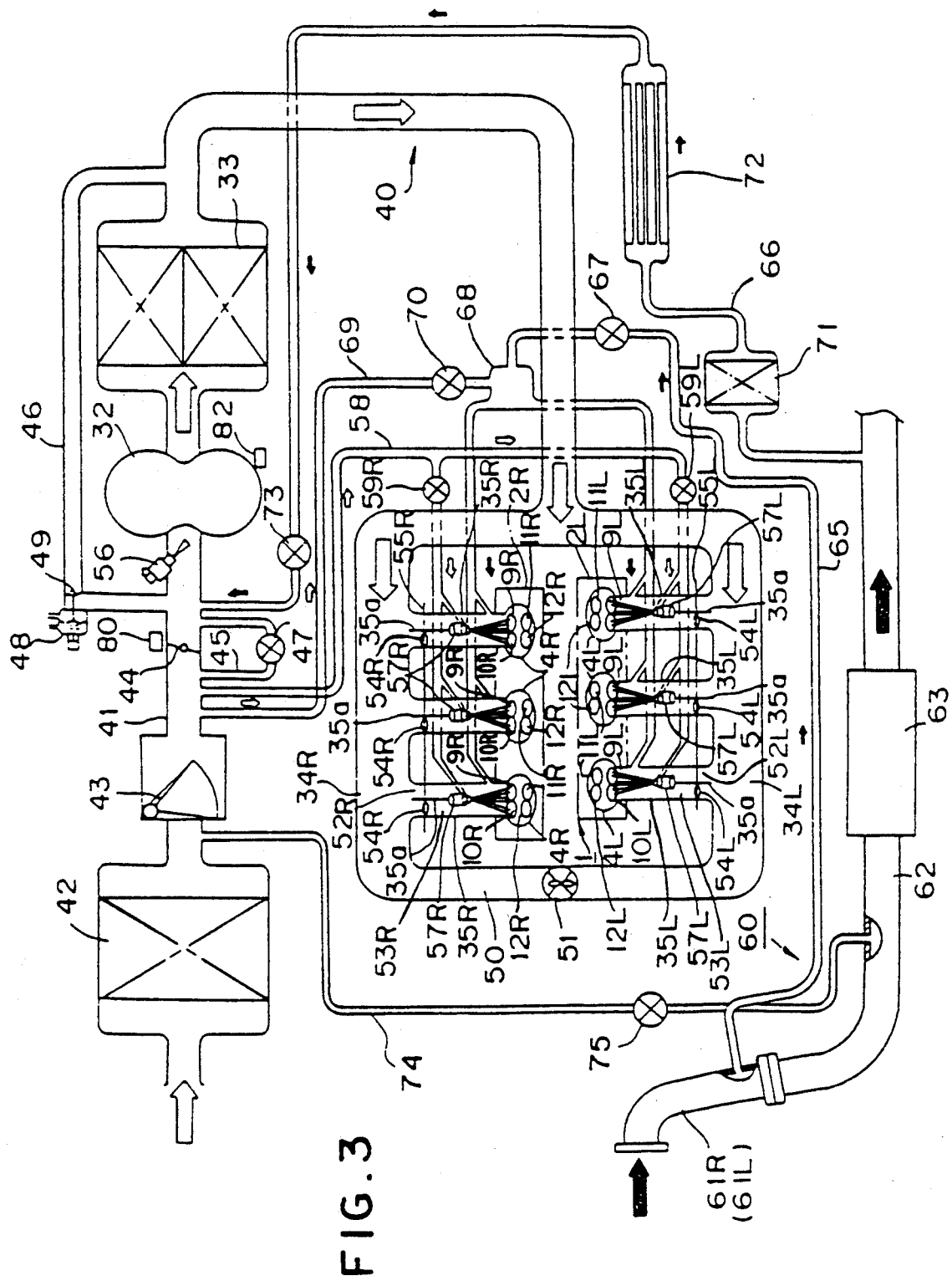
FIG. 3 is a schematic representation showing an intake system and an exhaust system of the internal combustion engine according to the first embodiment of the present invention.

As shown in FIG. 3, an exhaust system 60 of the engine comprises a left-hand exhaust manifold 61L for the left-hand bank portion 2L, a right-hand exhaust manifold 61R for the right-hand bank portion 2R, and a common exhaust tube 62, which are disposed in this order from the upstream side toward the downstream side. The common exhaust tube 62 is provided in its intermediate position with a catalyst (ternary catalyst) converter 63 for cleaning exhaust gases and at its downstream end with a silencer (not shown) in a manner as is known to the art.

The body 1 of the engine has a first outer EGR passage 65 and a second outer EGR passage 66, each being capable of recirculating a portion of the exhaust gases discharged from the engine. Each of the first and second outer EGR passages 65 and 66 contains an outer tube consisting of a tube member disposed outside the main body 1 of the engine. The outer tube for the second outer EGR passage 66 is so arranged as to be sufficiently longer than that for the first outer EGR passage 65. A sectional diameter of the first outer EGR passage 65 is smaller than that of the second outer EGR passage 66. Hence, the first outer EGR passage 65 is so adapted as to be employed in a low load region, while the second outer EGR passage 66 is so adapted as to be employed in a high load region, as will be described hereinafter.

The first outer EGR passage 65 is connected at its one end to the exhaust manifold 61L or 61R and at its other end to the first intake port 9. To the first outer EGR passage 65 are mounted a first EGR valve 67 on its one end side and a collective chamber 68 on its other end side. The collective chamber 68 is communicated with the common intake tube 41 through a bypass air tube 69 to which a bypass air control valve 70 in turn is mounted. On the other hand, the one end of the second outer EGR passage 66 is connected to the common exhaust tube 62 on the side downstream of the catalyst converter 63, and the other end thereof is connected to the common intake tube 41 on the side upstream of the supercharger 32, yet downstream of the throttle valve 44. The second outer EGR passage 66 is provided from the one end side to the other end side with a carbon trap 71, an EGR cooler 72, and a second EGR valve 73.

In addition, as shown in FIG. 3, the main body 1 of the engine is provided with a secondary air supply passage 74 connected to the common intake tube 41 and the common exhaust tube 62. The secondary air supply passage 74 has its one end connected in a position interposed between the air cleaner 42 and the air flowmeter 43 and the other end connected on the upstream side of the catalyst converter 63, and it is provided with a secondary air control valve 75.

Specification of Engine

A specification of the engine is as follows:
(1) Type of engine: V-type 6-cylinder; DOHC 4-valve engine
(2) Angle between the left-hand bank portion and the right-hand bank portion: 90°
(3) Displacement: 1,496 cc
(4) Bore size of cylinder: 63 mm in diameter
(5) Stroke of piston: 80 mm
(6) Compression ratio ($\epsilon$): $\epsilon = 10$
(7) Angle between the intake valve and the exhaust valve: 30°
(8) Supercharger: of a screw type (a pressure ratio=2.5)
(9) Temperature at the outlet of the intercooler: 60° C.
(10) Fuel: regular gasoline (octane value=91)

Figure 4:
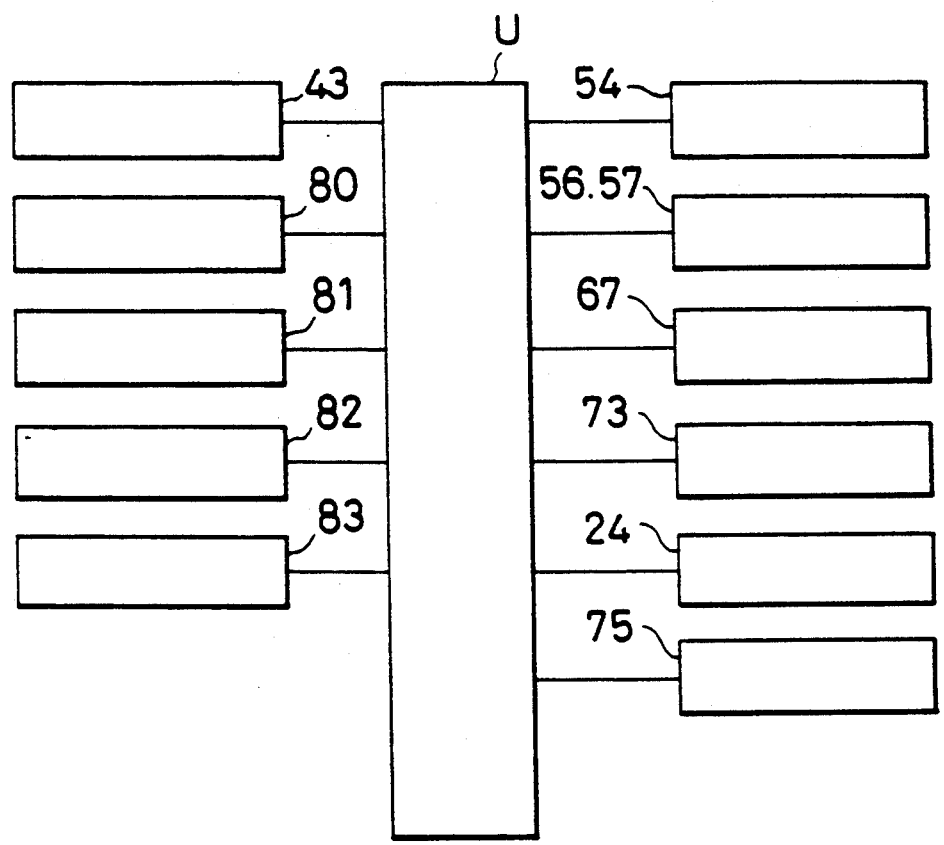
FIG. 4 is a block diagram showing a control system of the internal combustion engine according to the first embodiment of the present invention.

The engine has a control unit U as shown in FIG. 4, and the control unit U is comprised of, for example, a microcomputer which comprises, for example, a CPU, a ROM, a RAM, and the like, as is known to the art. Into the control unit U, signals are entered from the air flowmeter 43 for sensing an amount of intake air, a sensor 80 for sensing an angle of the opening of the throttle valve 44, a sensor 81 for sensing the number of rotation of the engine, a sensor 82 for sensing the number of rotation of the supercharger 32, and a sensor 83 for sensing the load of the engine from the pressure of the intake air. On the other hand, the control unit U generates control signals to the upstream injector 56, the downstream injector 57, the first EGR valve 67, the second EGR valve 73, the secondary air control valve 75, and the like.

The following is a description of the control to be made by the control unit U for the recirculation of the exhaust gases and the air-fuel ratio.

Control of EGR and Air-Fuel Ratio

Figure 5:
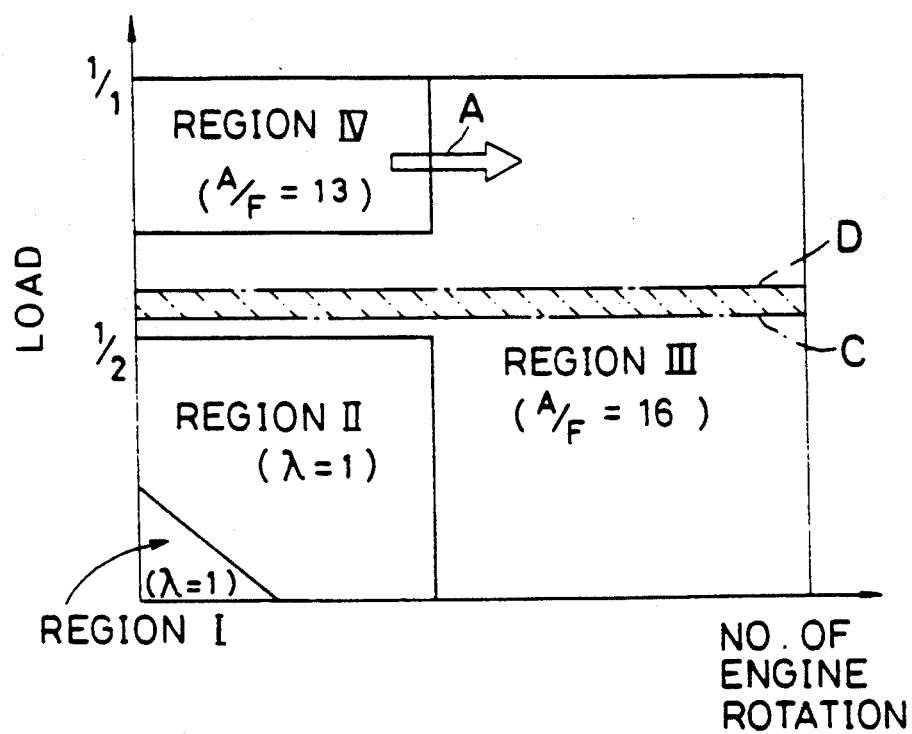
FIG. 5 is a map for controlling the recirculation of exhaust gases and the air-fuel ratio of the mixed fuel.
Figure 6:
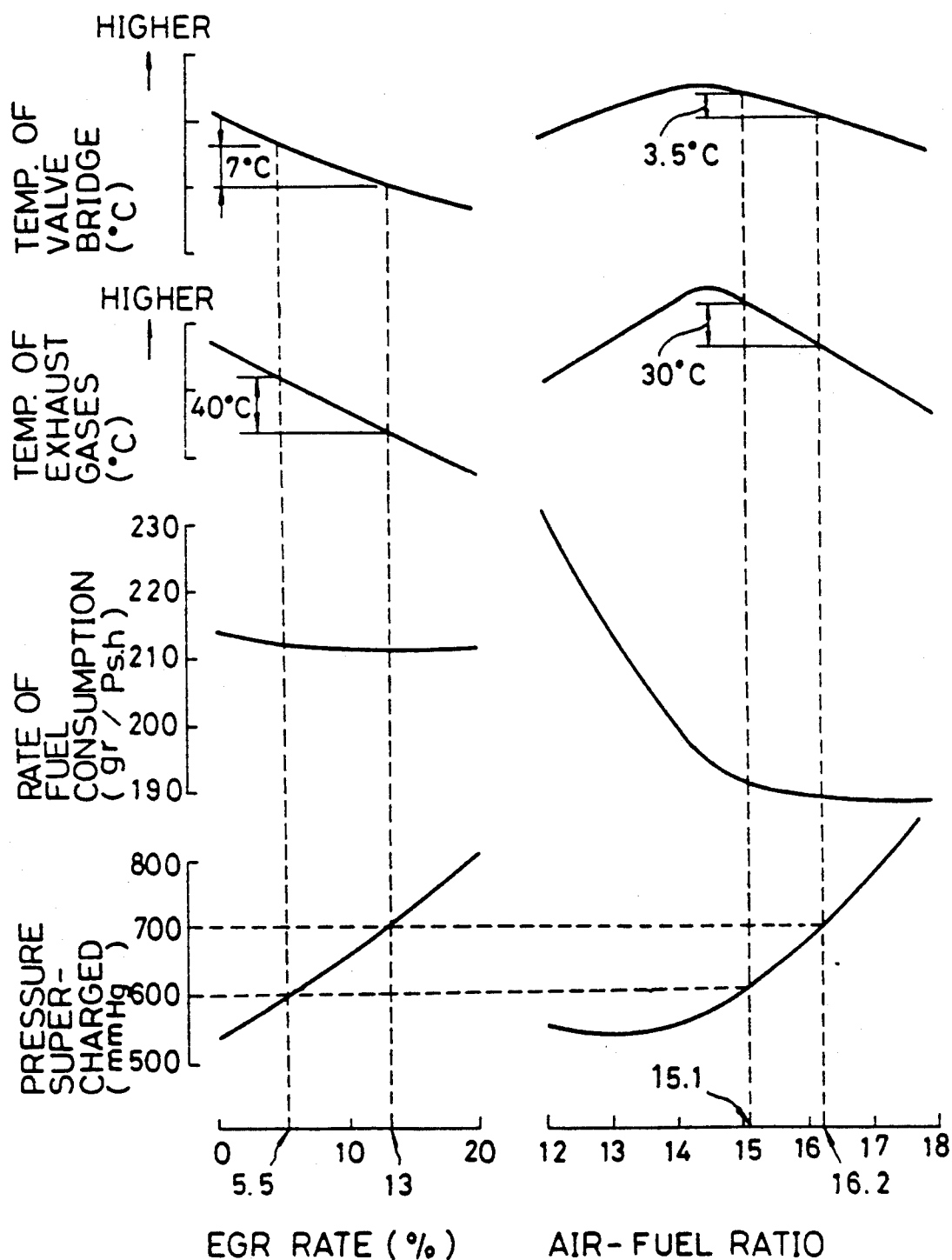
FIG. 6 is a graph showing the relationship among the air-fuel ratio and the rate of the recirculation of the exhaust gases (EGR) versus the temperature of the valve bridge portion, etc.
Figure 7:
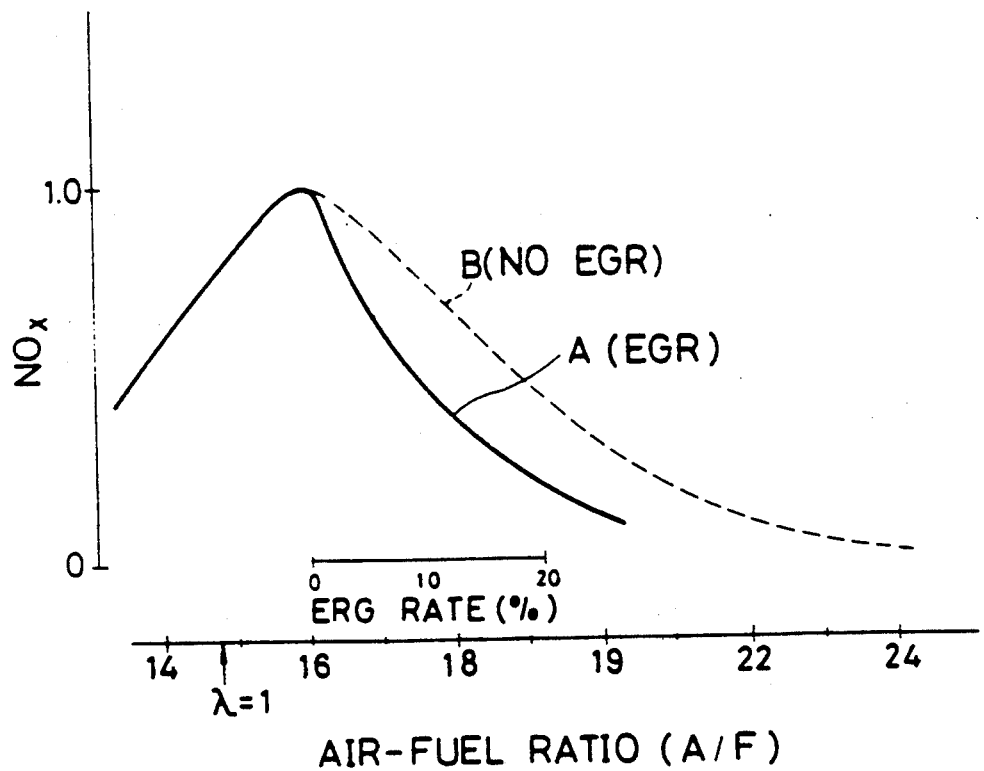
FIG. 7 is a graph showing improvements in a reduction of the rate of NOx within the exhaust gases with respect to the air-fuel ratio and the rate of the EGR.

The control of the recirculation of exhaust gases (EGR) is performed in four regions, i.e. region I, II, III, and IV, on the basis of the map as indicated in FIG. 5 by controlling the first EGR valve 67 and the second EGR valve 73 in a fashion as will be described hereinafter. In addition, the air-fuel ratio is controlled in the aforesaid regions by controlling the amounts of fuel from the injectors 56 and 57. As the control of the air-fuel ratio is performed in conventional manner, no description is made of the procedures of controlling the air-fuel ratio in each of the four regions, although a target air-fuel ratio in each of the four regions will be described hereinafter.

Region I: This region is a region wherein the load of the engine is extremely low and the number of rotation of the engine is extremely low. This region can be referred to as an approximately idling region.

In this region I, both of the first and second EGR valves 67 and 73 are closed to full extent. The target air-fuel ratio is a stoichiometric air-fuel ratio ($\lambda = 1$).

Region II: This region is a region wherein the load of the engine is low and the number of rotation of the engine is low.

In the region II, the exhaust gases are recirculated by opening the first EGR valve 67 while the second EGR valve 73 is closed to a full extent. On the other hand, the target air-fuel ratio is a stoichiometric air-fuel ratio ($\lambda = 1$).

Region III: This region is all the region in which the load of the engine is medium and the number of rotation of the engine is high. In this region, the supercharger can demonstrate its sufficient supercharging capability.

In the region III, the recirculation of the exhaust gases is controlled by the second EGR valve 73 on the side where the load is higher than the line C in FIG. 5, while the control of the recirculation of the exhaust gases is performed by the first EGR valve 67 on the side where the load is lower than the line D in FIG. 5. In a region interposed between the lines C and D (in a hatched area in FIG. 5), on the other hand, the recirculation of the exhaust gases is controlled by both of the first and second EGR valves 67 and 73.

In other words, in the region III, the exhaust gases having a relatively high temperature are recirculated by the first EGR valve 67 on the relatively low load region, while the exhaust gases having a lower temperature are recirculated by the first EGR valve 73 on the relatively high load region, i.e. a so-called cold EGR is performed. In this region, the target air-fuel ratio is leaner than the stoichiometric air-fuel ratio, such as the A/F ratio of 16.

The upstream end of the first outer EGR passage 65 is connected with the exhaust manifold 61, and it is so arranged as for a portion of the exhaust gases discharged from the main body 1 of the engine to be recirculated into the engine through the first outer EGR passage 65 on the relatively low load side in the region III, before they are allowed to cool in the exhaust system 60. Hence, the exhaust gases recirculated through the first outer EGR passage 65 is so relatively high that a loss in pumping can be reduced by making use of the exhaust gases recirculated.

On the other hand, on the relatively high load side in the region III, the exhaust gases are allowed to cool through the second outer EGR passage 66 with the EGR cooler 72 mounted thereto and then recirculated into the intake system of the engine through the second EGR valve 73. In other words, the cold EGR is performed. The upstream end of the second outer EGR passage 66 is connected with the downstream side of the exhaust system 60, and the downstream end thereof is connected with the upstream side of the intercooler 33. Hence, the exhaust gases discharged from the engine are allowed to cool in the exhaust system 60 and then introduced into the second outer EGR passage 66. The exhaust gases are then recirculated through the second outer EGR passage 66 into the intake system 40, followed by cooling the exhaust gases again with the intercooler 33.

By setting the target air-fuel ratio to the A/F ratio of 16 by recirculating the exhaust gases having a low temperature on the relatively high load side in the region III, the temperature within the engine (e.g. the temperature at the valve bridge portion) can be suppressed from elevating. Further, the cold EGR can suppress the elevation of the exhaust gases, thereby reducing the amount of NOx within the exhaust gases. The cold EGR is effective for enhancing reliability of the engine, in association with making the compression ratio higher and supercharging the intake air at a high rate.

Region IV: This region is a high load and low rotational region.

In the region IV, the rate of the exhaust gases to be recirculated is adjusted by the second EGR valve 73 while closing the first EGR valve 67. The exhaust gases are recirculated by the second outer EGR passage 66 with the EGR cooler 72 equipped. It can be noted that the target air-fuel ratio is set to the A/F ratio of approximately 13 in this region IV in order to pay more attention to the output of the engine, although the supercharger can demonstrate its own capability to a considerable extent in this region.

Hence, in the region IV, the temperature within the main body 1 of the engine with the highly increased pressure by supercharging and the higher compression ratio (e.g. the temperature of the valve bridge portion) or the temperature of the exhaust gases can be lowered by recirculating the cooled exhaust gases. Further, the recirculation of the cool exhaust gases can reduce the amount of the NOx within the exhaust gases.

As have been described hereinabove, the arrangement for the control of the recirculation of the exhaust gases and the air-fuel ratio can lower the temperature within the engine to an extent greater than the leaner air-fuel ratio can do, while ensuring the improvements in the rate of consumption of the fuel. Further, the amount of the NOx within the exhaust gases can be reduced to a high extent. Hence, the capacity of the supercharger to be employed for the supercharged engine according to the present invention may be smaller than that required for reducing the temperature within the engine merely by making the air-fuel ratio leaner, in order to achieve the same results in lowering the temperature within the engine. The disposition of the supercharger with the smaller capacity can also serve as further improving the rate of consumption of the fuel.

Control of Supply of Secondary Air

In the high load region IV as shown in FIG. 5, the supply of a secondary air is suspended by fully closing the secondary air control valve 75. On the other hand, in the region III wherein the air-fuel ratio is made leaner, the secondary air is basically fed to the exhaust system by opening the secondary air control valve 75.

In other words, in the region IV wherein the air-fuel ratio is made rich, unburned fuel is contained in the exhaust gases so that the unburned fuel is caused to burn in the exhaust system when the secondary air is fed in the region IV, thereby elevating the temperature of the exhaust gases. On the other hand, in the region III where the air-fuel ratio is made leaner, no unburned fuel exists so that the supply of the secondary air serves exclusively as cooling the exhaust gases, thereby contributing to improvements in reliability of the catalyst converter 63.

Control of EGR at the time of Shift of Air-Fuel Ratios

A description will now be made of the preferred mode of the control of the recirculation of the exhaust gases at the time when the air-fuel ratio is shifted, particularly between the region III wherein the air-fuel ratio is made leaner and the region IV where the air-fuel ratio is made richer.

Figure 8:
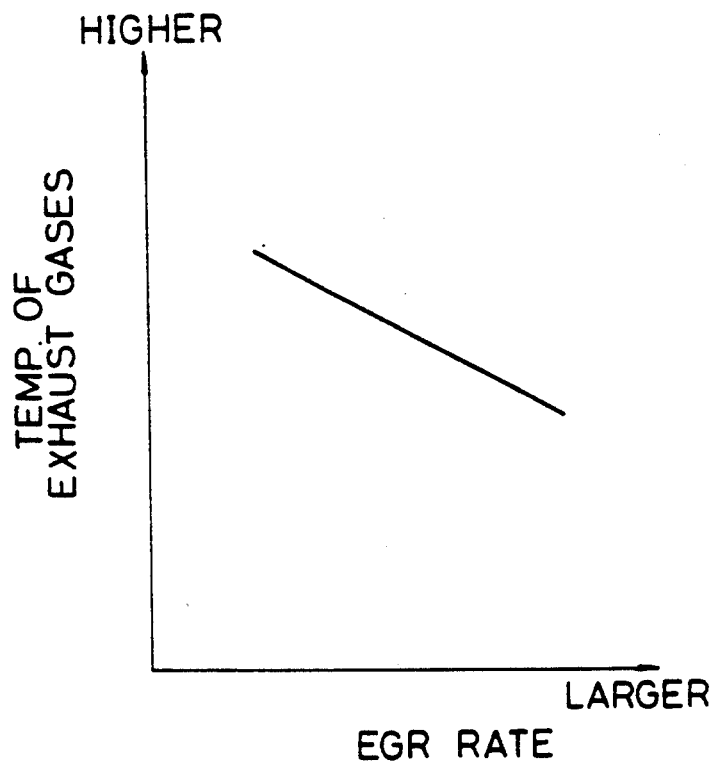
FIG. 8 is a graph showing the relationship between the rate of the EGR and the temperature of the exhaust gases.
Figure 9:
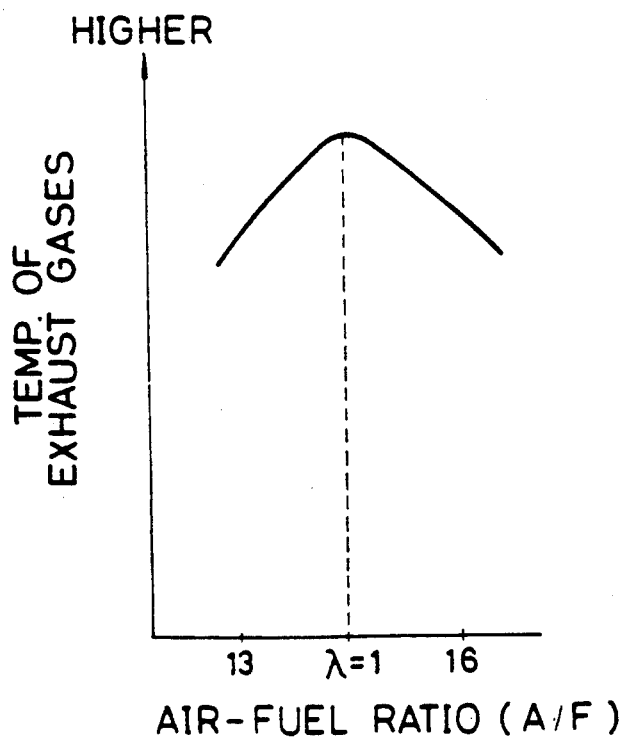
FIG. 9 is a graph showing the periodical relationship between the air-fuel ratio and the temperature of the exhaust gases.

When the air-fuel ratio is shifted between the regions III and IV, a transient region is caused to appear in between, wherein the air-fuel ratio becomes stoichiometric, i.e. $\lambda=1$ at A/F=14.7. As shown in FIG. 9, the temperature of the exhaust gases is elevated at the stoichiometric air-fuel ratio; however, the temperature of the exhaust gases is lowered when the rate of the exhaust gases to be recirculated is increased, as shown in FIG. 8. Hence, the elevation of the temperature of the exhaust gases can be prevented by temporarily raising the rate of the exhaust gases to be recirculated upon a shift of the air-fuel ratios between the regions III and IV. It is preferred to cause the rate of the recirculation of the exhaust gases to be raised temporarily prior to the shift of the air-fuel ratios and to hold the temporarily raised rate of the recirculation of the exhaust gases for a predetermined period of time even after the air-fuel ratios have been shifted.

A detailed description will now be made of a specific example in which the rate of the exhaust gases to be recirculated is temporarily increased upon the shift of the air-fuel ratios.

In the state in which the throttle valve 44 are full open, the running state of the engine exists in a situation in which it is transferred from the region IV (a region where the air-fuel ratio is rich) to the region III (a region where the air-fuel ratio is lean) in the direction as indicated by the arrow A in FIG. 5.

Figure 10:
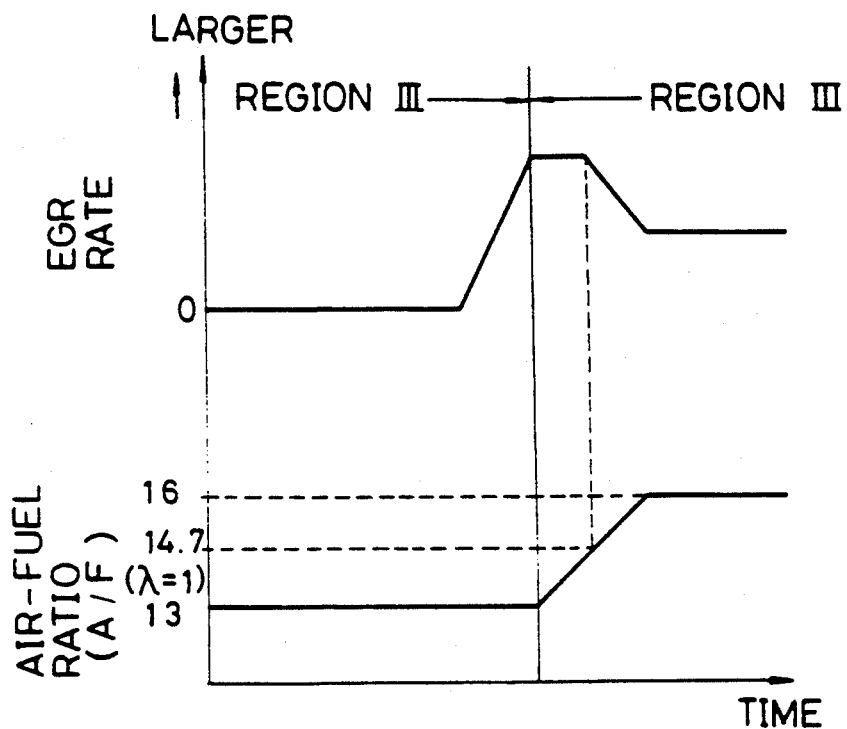
FIG. 10 is a time chart showing the relationship between the air-fuel ratio control and the EGR control.
Figure 12:
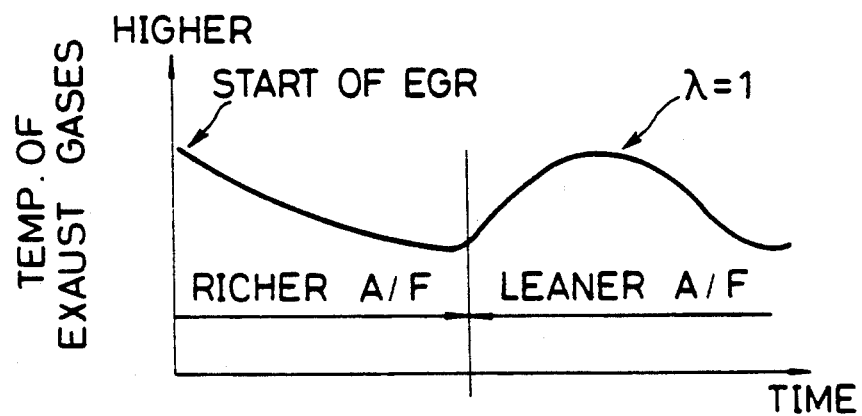
FIG. 12 is a time chart showing a variation of the temperatures of the exhaust gases when the exhaust gases are recirculated when the air-fuel ratio is changed from a rich region to a lean region.

The recirculation of the exhaust gases at the time of acceleration in a full open state of the throttle valve 44 is controlled in a mode as indicated in FIG. 10. The recirculation of the exhaust gases starts by making use of the surplus force created by making use of a surplus of the intake air supercharged into the engine, prior to the shift of the air-fuel ratios from the region IV to the region III, that is, prior to the shift of the air-fuel ratio from the rich air-fuel ratio to the lean air-fuel ratio, although the supercharger 32 starts demonstrating its capability gradually as the number of rotation of the engine is increased. The temperature of the exhaust gases is lowered gradually as shown in FIG. 12, as a result of the recirculation of the exhaust gases.

In the initial stage wherein the running state of the engine has been shifted from the region IV to the region III, the rate of the exhaust gases to be recirculated is held constant and the surplus of the intake air is consumed for making the air-fuel ratio leaner. Then, at the moment when the air-fuel ratio of the mixed fuel becomes stoichiometric ($\lambda=1$), the rate of the exhaust gases to be recirculated is reduced gradually to a predetermined rate of the recirculation of the exhaust gases at which the EGR rate is then maintained.

Figure 11:
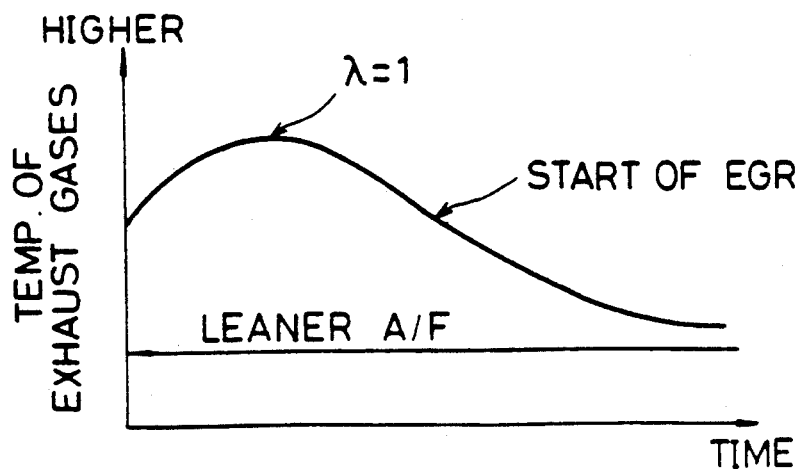
FIG. 11 is a time chart showing a comparative example of a variation in the temperatures of the exhaust gases when the air-fuel ratio is made lean and thereafter the exhaust gases are recirculated.

FIG. 11 shows a variation in the temperatures of the exhaust gases in the instance, as a comparison, where the air-fuel ratio is made leaner by making use of the surplus of the intake air given by supercharging the intake air, prior to the start of the recirculation of the exhaust gases. In this instance, the temperature of the exhaust gases continues elevating upon the shift from the region IV to the region III, so that the absolute value of the temperature of the exhaust gases becomes extremely high when the air-fuel ratio became stoichiometric ($\lambda=1$).

On the other hand, it is possible to temporarily raise the rate of recirculation of the exhaust gases when the region III (a lean air-fuel ratio) is shifted to the region IV (a rich air-fuel ratio). Further, it is possible to recirculate the exhaust gases in the region IV; however, in this case, the exhaust gases may be temporarily recirculated in the region IV at the time when the shift is being made between the regions IV and III. In other words, the exhaust gases may be recirculated prior to the shift of the air-fuel ratios. In addition, even if the air-fuel ratio in the region IV is made stoichiometric, the recirculation of the exhaust gases may be implemented so as to temporarily raise the rate of the exhaust gases to be recirculated in the same manner as described hereinabove.

Figure 13:
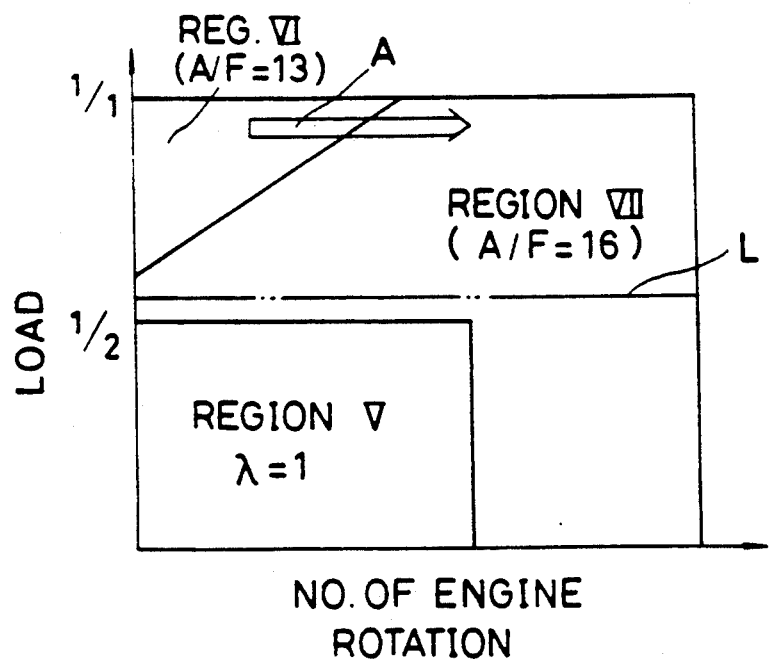
FIG. 13 is a control map for implementing the control of the air-fuel ratio and a secondary air.

Variant (FIG. 13)

FIG. 13 shows a variant corresponding to FIG. 5. In the instance of FIG. 13, the following control is implemented.

Control of EGR

In a low load region below or above the line L in FIG. 13, the control of the recirculation of the exhaust gases is implemented by opening the first EGR valve 67 while closing the second EGR valve 73 to a full extent. This arrangement for the EGR valves 67 and 73 allows the exhaust gases having higher temperatures to be recirculated into the intake system through the first outer EGR passage 65, thereby reducing the problem with the loss in pumping, which arises in the low load region. It can also be noted herein that, in the low rotational region, the recirculation of the exhaust gases can be suspended.

On the other hand, in a high load region above or below the line L in FIG. 13 (provided that the low rotational region VI in FIG. 13 is excluded), the recirculation of the exhaust gases is controlled by opening the second EGR valve 73 while closing the first EGR valve 67 to a full extent. This arrangement allows the exhaust gases cooled through the second outer EGR passage 66 with the EGR cooler 72 to be recirculated into the intake system of the engine, i.e. a cold EGR is performed. This cold EGR serves as lowering the temperature of the exhaust gases and reducing the amount of NOx within the exhaust gases.

Control of Air-Fuel Ratio

In the low rotational and low load region V in FIG. 13, the air-fuel ratio is controlled so as to become stoichiometric ($\lambda = 1$).

On the other hand, in the high load region VI, the air-fuel ratio is controlled so as to make the air-fuel ratio the A/F ratio of approximately 13. It is to be noted herein that the supercharger 32 cannot demonstrate its capability to an extent better in the region VI than in the region VII, although the intake air can be supercharged into the engine by the supercharger 32.

In the region VII, except for the regions V and VI, the air-fuel ratio is controlled so as to amount to the A/F ratio of approximately 16.

In the instance of FIG. 13, too, the target air-fuel ratio in the region VI may be set to a stoichiometric air-fuel ratio, and the cold EGR may be performed. It can be noted as a matter of course that the absolute value of the temperature of the exhaust gases can be suppressed from increasing by carrying out the recirculation of the exhaust gases prior to the shift from the region VI to the region VII or by raising the rate of the recirculation of the exhaust gases.

This can be applied to the instance where the air-fuel ratio is made rich by setting a base air-fuel ratio to a lean air-fuel ratio and correcting the air-fuel ratio by increasing the fuel at the time of acceleration. In this case, the exhaust gases can be recirculated, prior to making the air-fuel ratio lean upon the completion of the acceleration, by operating a timer in synchronization with the detection of the acceleration and performing the recirculation of the exhaust gases after a predetermined period of time has elapsed.

Furthermore, the supply of the secondary air is suspended in the region VI and the secondary air is fed in the region VII. This is true in the instance of FIG. 5.

Structure of Intake System (FIGS. 14–18)

FIGS. 14 to 18 show a preferred configuration of the intake system in the vicinity of a fuel injection valve, or an injector, which is suitable for application to the embodiment of the supercharged engine as shown in FIGS. 1 to 3.

The example of the intake system as shown in FIGS. 14 to 18 relates to an intake system for an internal combustion engine of a fuel injection type, which has an intake passage with a curved section. This intake system serves as facilitating vaporization and atomization of fuel by injecting the fuel into the intake air at a high speed and improving efficiency in filling by maintaining a mean flow speed at a high level. This arrangement can also achieve improvements in scavenging performance.

Figure 14:
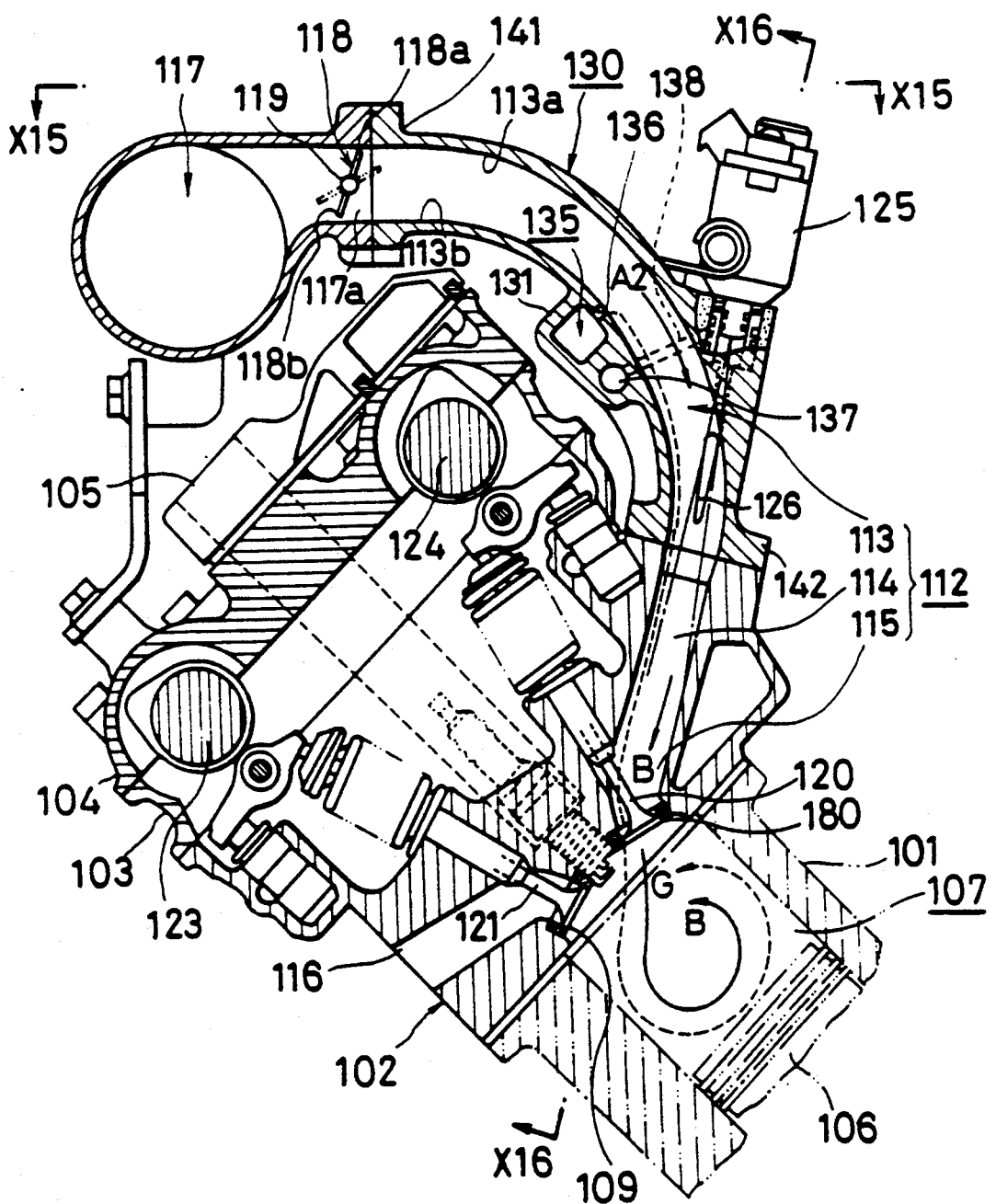
Figure 15:
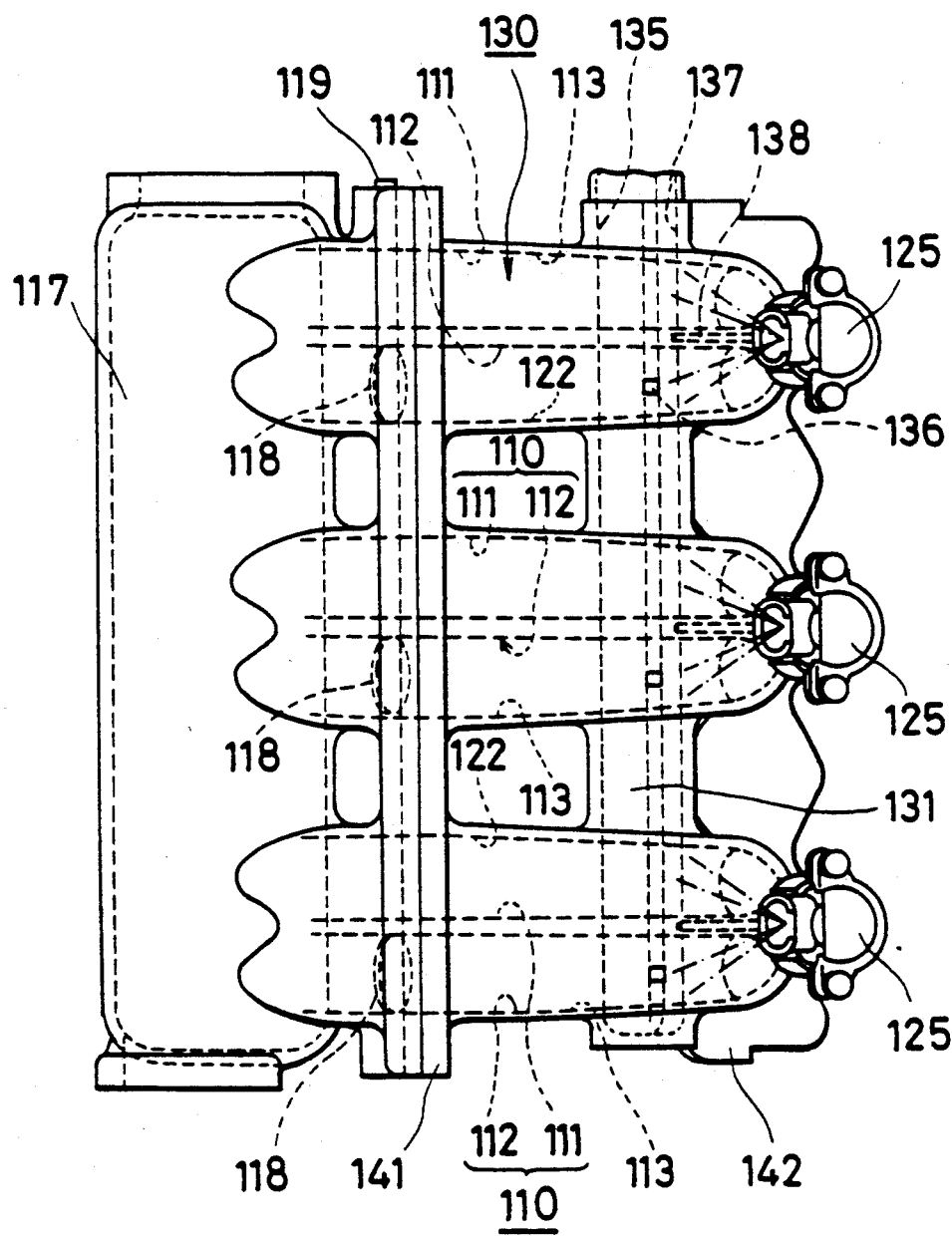

FIGS. 14 and 15 show a left-hand bank portion of a V-type engine, which corresponds to the left-hand bank portion 2L in FIG. 1.

Figure 18:
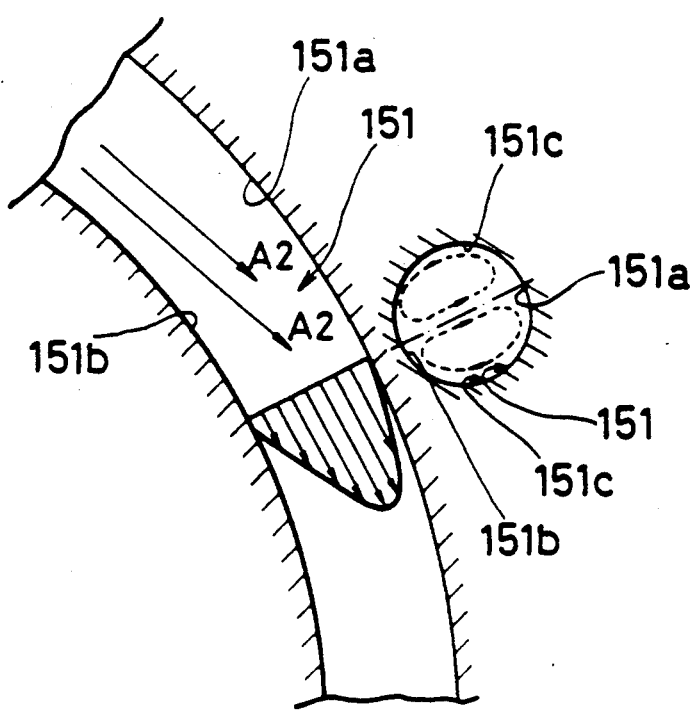

In FIGS. 14 and 18, reference numeral 101 stands for a cylinder block, reference numeral 102 for a cylinder head, reference numerals 103 and 14 for cam carriers for carrying a pair of left-hand and right-hand camshafts 123 and 124, reference numeral 105 for a head cover, reference numeral 106 for a piston, and reference numeral 107 for a combustion chamber. The engine to be employed in this embodiment of the present invention is an engine having two intake valves and two exhaust valves. On the bottom of the cylinder head 102, facing the combustion chamber 107, are formed intake ports 108 as well as exhaust ports 109. To the intake ports 108 are mounted intake valves 120. To the exhaust ports 109 are mounted exhaust valves 121.

The intake ports 108 are connected to a surge tank 117 disposed above the head cover 105 through a primary passage 111 and a secondary passage 112, which are disposed in a discrete way. The primary passage 111 and the secondary passage 112 constitute an intake passage 110 for each of the cylinders. The primary passage 111 is so arranged as to introduce intake air in an entire running region of the engine, and the secondary passage 112 is so arranged as to introduce the intake air only in the high load region in which the load of the engine is equal to or higher than a predetermined value. The primary passage 111 and the secondary passage 112 have the same configurations, with the exception that an opening-closing valve 118, as will be described hereinafter, is mounted in the uppermost upstream position of the secondary passage 112, that is, at an outlet portion 117a of the surge tank 117 and the secondary passage 112 is provided in its intermediate position with an injecting outlet 136 for injecting a supplementary gas such as blow-by gas or exhaust gases for recirculation to be added to the intake air. Hence, a description will be made of the configuration of the secondary passage 112 only with reference to FIGS. 14 to 16, inclusive, and a description of the primary passage 111 will be omitted from the description that follows.

The secondary passage 112 comprises a curved section on the downstream side (a downstream curved section) 115, a straight section 114, and a curved section on the upstream side (an upstream curved section) 113. The downstream curved section 115 is disposed extending continuously from the intake port 108 and curved gradually to the side of the engine while extending upward within the cylinder head 102. The straight section 114 is disposed extending in a straight line continuously from an upstream end of the downstream curved section 115 in an obliquely upward direction within the cylinder head 102, and an upstream end of the straight section 114 is disposed so as to open at the side of the cylinder head 102. The upstream curved section 113 is disposed astride the upstream end of the straight section 114 and the outlet section 117a of the surge tank 117 so as to be detachable and curved in a direction opposite to the downstream curved section 115 so as to surround the upper end portion of the engine from its side. At the outlet section 117a of the surge tank 117 located in the uppermost upstream position of the secondary passage 112 is mounted the opening-closing valve 118 composed of a butterfly valve in such a manner that its valve shaft 119 is directed in the direction perpendicular to a curved surface of the upstream curved section 113 and that its peripheral edge section 118a located in the position closer to an outer peripheral wall 113a of the upstream curved section 113 is located on the downstream side than the valve shaft 119 of the opening-closing valve 118 and its peripheral section 118b located in the position closer to an inner peripheral wall 113b thereof is located on the upstream side than the valve shaft 119. When the opening-closing valve 118 is opened, the relationship between the position of the peripheral edge section 118a and the position of the peripheral edge section 118b is the same, as indicated by two-dots-and-dash line in FIG. 14.

Figure 16:
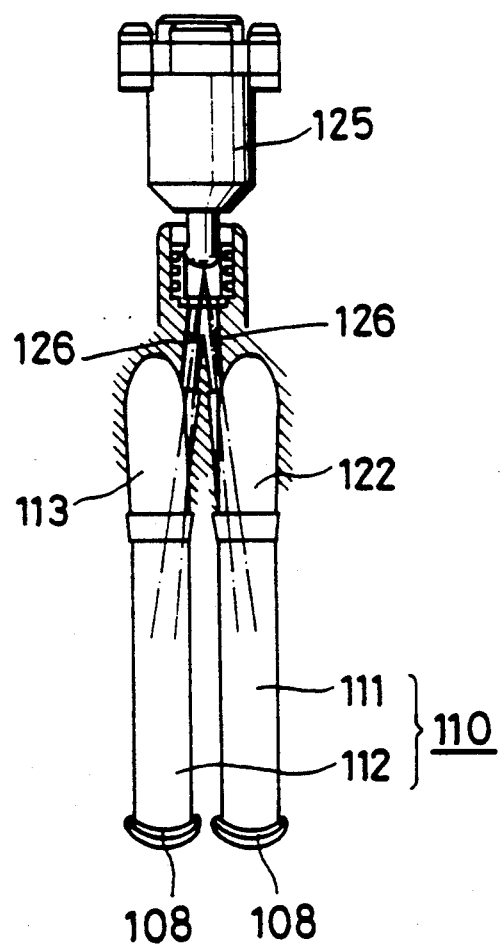

As shown in FIG. 15, the upstream curved section 113 is formed integrally with a downstream curved section 122 of the primary passage 111 in a state in which the curved sections are disposed side by side (as shown in FIGS. 15 and 16), and an intake manifold 130 is composed of a pair of upper and lower flanges 141 and 142, respectively, which are connected with each other in the position between the intake passages 110 for each cylinder.

Further, as shown in FIGS. 14 and 16, an injecting hole 126 for injecting fuel into the upstream curved section 113 is disposed in the position in the vicinity of the downstream end of the upstream curved section 113 and closer to the outer peripheral wall 113a so as to be directed to the intake ports 108 through the straight section 114. In addition, an injector 125 is disposed on the upstream end side of the injecting hole 126. The injecting hole 126 having the arrangement as described hereinabove is likewise provided in the upstream curved section 122 of the primary passage 111, and the fuel injected from the injector 125 is supplied simultaneously to the primary passage 111 and the secondary passage 112 through the two injecting holes 126 respectively.

On the other hand, as shown in FIGS. 14 and 15, the intake manifold 130 is formed integrally with a transverse section 131 in the position outside the inner peripheral wall 113b of the upstream curved section 113 in such a state that the intake passages 110 for each cylinder are disposed transversely astride the transverse section 131. The transverse section 131 has a supplementary gas passage 135 and an assist air passage 137 disposed in a closely juxtaposed relationship in its inside over its substantially full length. The supplementary gas passage 135 is so disposed as to open in the inner peripheral wall 113b on the upstream side than the injecting hole 126 through the injecting section 136 formed so as to penetrate through the inner peripheral wall 113b of the upstream curved section 113. The supplementary gas such as the blow-by gas or the exhaust gases for recirculation, which is injected from the exhaust passage 116, is allowed to flow through the supplementary gas passage 135 into each of the cylinders and into the secondary passage 112 of the cylinder corresponding to the injecting section 136. On the other hand, the assist air passage 137 is communicated with the uppermost upstream portion of the injecting hole 126 through a connecting passage 138 formed within the intake manifold 130, and an assist air fed into the assist air passage 137 is allowed to pass into each of the cylinders, followed by being supplied to the uppermost upstream portion of the injecting hole 126 from the connecting passage 138.

A description will now turn to operations and effects of the intake device of the configuration as described hereinabove by taking mainly a flow through the secondary passage 112 as an example. As the engine starts up, the opening-closing valve 118 is closed and held in its closed state in a low load region. The intake air is introduced into the combustion chamber 107 only from the primary passage 111 and a swirl flow is caused to occur in the combustion chamber 107. In this instance, the fuel is injected from the injector 125 and divided into the primary passage 111 and the secondary passage 112, so that a mixed fuel containing the intake air and the fuel is introduced into the combustion chamber 107 from the primary passage 111, while the fuel only is introduced into the combustion chamber 107 from the secondary passage 112. In addition, the assist air fed into the assist air passage 137 is injected through the connecting passage 138 into a site in the vicinity of the injecting hole 126 of the injector 125, thereby facilitating the admixture of the fuel with the intake air and vaporizing and atomizing the fuel. The supplementary gas fed into the supplementary gas passage 135 is introduced into the upstream curved section 113 of the secondary passage 112 from its injecting section 136. Hence, in a stricter sense, a mixed gas containing the fuel and the supplementary gas G is introduced into the combustion chamber 107 from the secondary passage 112.

As the load of the engine is raised to a high load running region, the opening-closing valve 118 is allowed to open, so that the mixed fuel is introduced into the combustion chamber 107 from both of the primary passage 111 and the secondary passage 112. In addition, the supplementary gas is introduced from the injecting section 136 into the upstream curved section 113 of the secondary passage 112.

Now, a description will be made of the flow of the intake air and the supplementary gas within the secondary passage 112 and the mixing of the fuel in the high load running state. After the intake air has been introduced from the surge tank 117 through the opening-closing valve 118 into the secondary passage 112, it is allowed to flow within the secondary passage 112 from its upstream curved section 113 through its straight section 114 to the downstream curved section 115, followed by inhalation from the intake ports 108 into the combustion chamber 107. In this instance, as the upstream curved section 113 is curved to a large extent, the flow speeds in the upstream curved section 113 are distributed in such a state that the maximum flow speed is deviated on the side of the outer peripheral wall surface 113a due to a secondary flow resulting from the inertia of the intake airflow, as indicated by the flow distribution curve L1 in FIG. 17. The deviation of the distribution of the flow speeds is caused to occur to a particularly remarkable extent, when the Opening-closing valve 118 is opened. As the opening-closing valve 118 is operatively opened so as for its outer peripheral edge section 118a located in the position closer to the outer periphery of the curved section thereof to be located on the downstream side of the intake air, the intake air introduced from the surge tank 117 undergoes the action of the flow that deviates toward the outer periphery of the curved section by means of the opening-closing valve 118, when the intake air passes through the opening-closing valve 118. Hence, the highest maximum flow speed can be attained in this instance.

In conventional configurations of the engines, a distribution of the deviated flow speeds is sustained during a period of time when the intake air passes through the upstream curved section 113. In this embodiment, however, the distribution of the deviated flow speeds is so arranged as to vary in accordance with the passage of the intake air because the supplementary gas is introduced into the upstream curved section 113 through the injecting section 136 formed on the inner peripheral wall 113b in the intermediate position of the upstream curved section 113.

Figure 17:
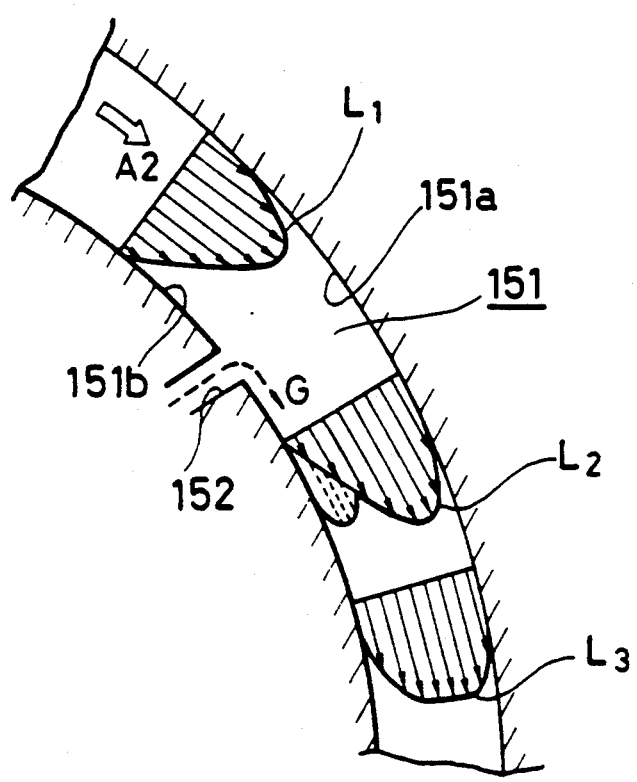

It can be noted that the distribution of the flow speeds on the upstream side than the injecting section 136 can be represented by the flow speed distribution curve L1 in FIG. 17. Hence, the dynamic pressure is lowered in the vicinity of the inner peripheral wall surface 113b of the upstream curved section 113, due to the flow of the intake air, as indicated by the arrow A2, so that the supplementary gas G can be introduced smoothly into the upstream curved section 113. The supplementary gas G introduced in the vicinity of the inner peripheral wall surface 113b is pressed, as it is, toward the downstream side by the intake airflow in the upstream curved section 113, and it is brought into a state in which the supplementary gas is added to the intake airflow, as indicated by reference symbol A2 in FIG. 14, thereby resulting in the flow speed distribution curve L2 in FIG. 17 on the immediately downstream side of the injecting section 136 and, as a result, forming a distribution having two peaks of the high flow speeds in the positions closer to the outer peripheral wall surface 113a and closer to the inner peripheral wall surface 113b, respectively.

The state in which the distribution of the flow speeds has two peaks of high flow speed is not sustained for a long period of time. As the time elapses, the high flow speed region in the position closer to the inner peripheral wall surface 113b is pressed gradually toward the side of the outer peripheral wall surface 113a, due to the passage of the intake air and an impact from a secondary flow, thereby resulting in a distribution of flow speeds of an approximately trapezoidal shape, as indicated by the flow speed distribution curve L3 in FIG. 17, wherein there is no big difference in flow speeds in the positions closer to the outer peripheral wall surface 113a and closer to the inner peripheral wall surface 113b. In this state, there is little variation in the maximum flow speeds in the position closer to the outer peripheral wall surface 113a; however, a mean flow speed in the upstream curved section 113 is elevated to a great extent. The elevation of the mean flow speed can increase the sectional area of the upstream curved section 113, which can be capable of contributing to the introduction of the intake air effectively, thereby improving efficiency in utilization of the effective sectional area. Further, it allows the intake air to be introduced in a larger quantity and at a higher speed, thereby improving efficiency in filling with the intake air and eventually improving output performance. It is noted that, when the distribution of the flow speeds on the downstream side of the injecting section 136 for injecting the supplementary gas is improved, this exerts its influence not only upon the downstream side of the injecting section 136 but upon the upstream side thereof, and the distribution of the flow speeds on the upstream side thereof can be improved as well as that on the downstream side thereof can be improved.

Since the high flow speed region achieved in the position closer to the inner peripheral wall surface 113b by adding the supplementary gas is allowed to migrate gradually toward the side of the outer peripheral wall surface 113a as the intake air flows downward, the flow speeds are caused to be distributed in such a state that the highest mean flow speed, as indicated by the flow speed distribution curve L3 in FIG. 17, can be gained in the position downward to some extent from the position where the injecting section 136 for injecting the supplementary gas is formed. As the intake air flows further downward, a deviation in the distribution of the flow speeds is caused to occur to a remarkable extent again on the side of the outer peripheral wall surface 113a and eventually the distribution of the flow speeds is formed, in which only the maximum flow speed projects. This distribution of the flow speeds is not suitable for improving the efficiency in the filling with the intake air. Hence, in this embodiment, the downstream end of the upstream curved section 113 is arranged so as to be disposed in the position in the vicinity of the position in which the distribution of the flow speeds as indicated by the flow speed distribution curve L3 in FIG. 17 is formed and so as to allow the injecting hole 126 of the injector 125 to open in this position.

The fuel injected from the injector 125 is fed in the axial direction of the straight section 114 from the injecting hole 126 having the opening disposed in the position closer to the outer peripheral wall surface 113a, in which the distribution of the flow speeds as indicated by the flow speed distribution curve L3 in FIG. 17 can be gained; hence, the fuel is allowed to migrate together with the intake airflow at the portion having the highest flow speed, thereby facilitating the admixture with the intake air and as a consequence accelerating the vaporization and the atomization of the fuel leading eventually to improvements in combustion performance of the engine.

On the other hand, the supplementary gas introduced into the upstream curved section 113 is allowed to migrate gradually toward the outer peripheral wall surface 113a due to the secondary flow. However, the supplementary gas does not migrate as a whole toward the outer peripheral wall surface 113a and it moves gradually while it is being mixed with the intake air. When this flow of the supplementary gas is observed as a whole flow within the secondary passage 112, the supplementary gas G introduced in the position closer to the inner peripheral wall surface 113b of the upstream curved section 113 provides a distribution of density in the range of the secondary passage 112 up to its downstream end, that is, up to the intake port 108, in such a manner that the density of the supplementary gas G is higher at the portion closer to the inner peripheral wall surface 113b of the upstream curved section 113 than at the portion closer to the outer peripheral wall surface 113a thereof. Hence, the temperature of the intake air (in a stricter sense, the temperature of the mixed fuel composed of the intake air and the supplementary gas) over the length from the position nearby the downstream end of the upstream curved section 113 to the straight section 114 is higher at the portion closer to the inner peripheral wall surface 113b of the upstream curved section 113 than the outer peripheral wall surface 113a thereof. The same thing can be said of the temperature on the wall surface.

Therefore, the fuel injected into the upstream curved section 113 from the injecting hole 126 is transferred into the combustion chamber 107 together with the intake air flowing at a high flow speed. In addition, the temperature on the inner peripheral wall surface 113a of the upstream curved section 113 and the ambient temperature at the portion near the inner peripheral wall surface 113a thereof are made so higher that the fuel is vaporized and atomized in a favorable way at that portion. These facts can prevent the fuel from attaching to the inner peripheral wall surfaces of the upstream curved section 113, the straight section 114 and the downstream curved section 115, resulting in improvements in response of the output of the engine upon the control of the fuel.

It can further be noted that the intake air flows mainly at the portion closer to the outer peripheral wall surface 113a of the upstream curved section 113 of the secondary passage 112, on the one hand, and the supplementary gas flows mainly at the portion closer to the inner peripheral wall surface 113b thereof, on the other hand. In this embodiment, the straight section 114 is disposed extending to the intake port 108 at a considerably large angle and the downstream curved section 115 following the straight section 114 is curved toward the axis of the combustion chamber 107 so that the mixed fuel inhaled into the combustion chamber 107 from the intake port 108 is caused to turn up and down in the combustion chamber 107 forming a so-called tumble flow. On the other hand, in this embodiment, the supplementary gas G that exists mainly at the portion closer to the inner peripheral wall surface 113b of the upstream curved section 113 as described hereinabove is then flown into the combustion chamber 107, as it is, along the wall surface of the straight section 114 and the wall surface of the downstream curved section 115, each located at the side of the inner peripheral wall surface 113b of the upstream curved section 112; hence, the supplementary gas G introduced into the combustion chamber 107 exists in layers at the portion near the inner wall of the combustion chamber 107 or near the top surface of the piston 106, thereby causing the supplementary gas G in layers to wrap up the mixed fuel B containing the intake air and the fuel and allowing the gases to exist in layers in the combustion chamber 107.

The mixed fuel existing in layers in the combustion chamber 107 can realize dilute combustion resulting in improvements in fuel economy. In addition, the emission of exhaust gases and knocking performance can be improved at the same time. In other words, the outer peripheral portion of the combustion chamber 107, where the temperature of combustion is so relatively low that unburned components of the fuel are likely to occur due to poor combustion, can be occupied with the supplementary gas that cannot be burned, so that the mixed fuel does not flow or only slightly flows into the portion concerned, thereby causing no combustion at that portion and as a consequence suppressing the unburned components of the fuel from occurring. This can improve the emission of the exhaust gases. Furthermore, the occupation of the outer peripheral portion of the combustion chamber 107 with the supplementary gas can contribute to disappearance of an end gas zone itself, which results in a cause of knocking, so that the knocking can be prevented from occurring, whereby improvements in the output performance can eventually be expected because of a higher compression ratio.

Turning now to the low load region of the engine, the opening-closing valve 118 is closed; however, the opening-closing valve 118 is composed of a butterfly valve so that, even if it is closed fully, there is a minute gap between its peripheral portion and the wall surface of the passage and a small amount of the intake air is allowed to leak through the gap into the intake port 108. Further, in this embodiment, the opening-closing valve 118 is disposed in the position in the vicinity of the upstream end of the upstream curved section 113, although it is generally disposed in the position close to the intake port in conventional cases; hence, the volume within the upstream curved section 113 over the length between the opening-closing valve 118 and the intake valve 120 becomes so large that the volume of the intake air leaked through the gap of the opening-closing valve 118 and stayed in this region can be increased to a great extent. Such a large quantity of the intake air stayed within the upstream curved section 113 can serve as scavenging the portion around the exhaust port 109 efficiently because the large quantity of the intake air is allowed to flow into the combustion chamber 107 from the intake port 108 when the open state of the intake valve 120 overlaps with the open state of the exhaust valve 121 in the final stage of the exhaust stroke of the piston.

Further, the close juxtaposition of the supplementary gas passage 135 and the assist air passage 137 within the transverse section 131 can serve as furthering the vaporization and the atomization of the fuel by the aid of the assist air because the assist air within the assist air passage 137 can be made hotter by the heat of the supplementary gas flowing through the supplementary gas passage 135 and then supplied at the portion close to the injecting hole 126 of the injector 125.

On the other hand, the transverse section 131 with the supplementary gas passage 135 and the assist air passage 137 formed in its inside is arranged astride the intake passages 110 of the intake manifold 130 in the direction in which the cylinders are disposed, so that the intake manifold 130 is connected with the transverse section 131 at its intermediate portion. Further, the intake manifold 130 is connected at its upper and lower end portions with flanges 141 and 142. This arrangement can enhance the rigidity of the intake manifold 130, resulting in an increased rigidity of the engine as a whole and reducing noises caused by the vibration of the engine.

In this embodiment, although the injecting section 136 for injecting the supplementary gas is provided on the secondary passage 112, the location of the injecting section 136 is not restricted to this position and it may be provided, for example, on the primary passage 111.

It is further to be noted that the structuring elements as shown in FIGS. 14 to 18, inclusive, correspond to those as shown in FIGS. 1 to 3, inclusive, as follows: the intake passage 110 corresponding to the discrete intake tube 35; the primary passage 111 corresponding to the first discrete intake tube 52; the secondary passage 112 corresponding to the second discrete intake tube 53; the opening-closing valve 118 corresponding to the shutter valve 54; the injector 125 corresponding to the downstream injector 57: and the supplementary gas passage 135 corresponding to the first outer EGR passage 65.

Figure 19:
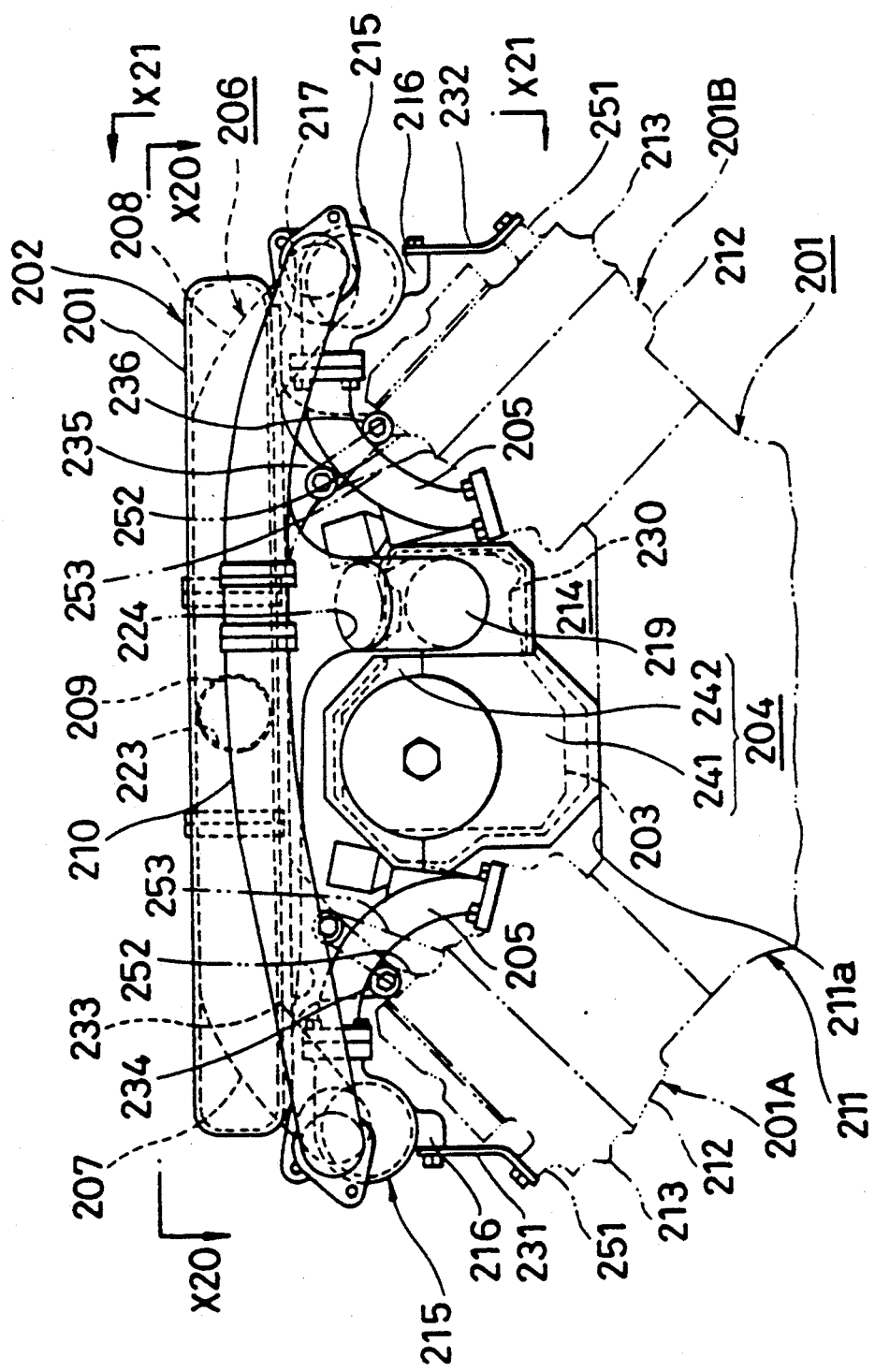
Figure 20:
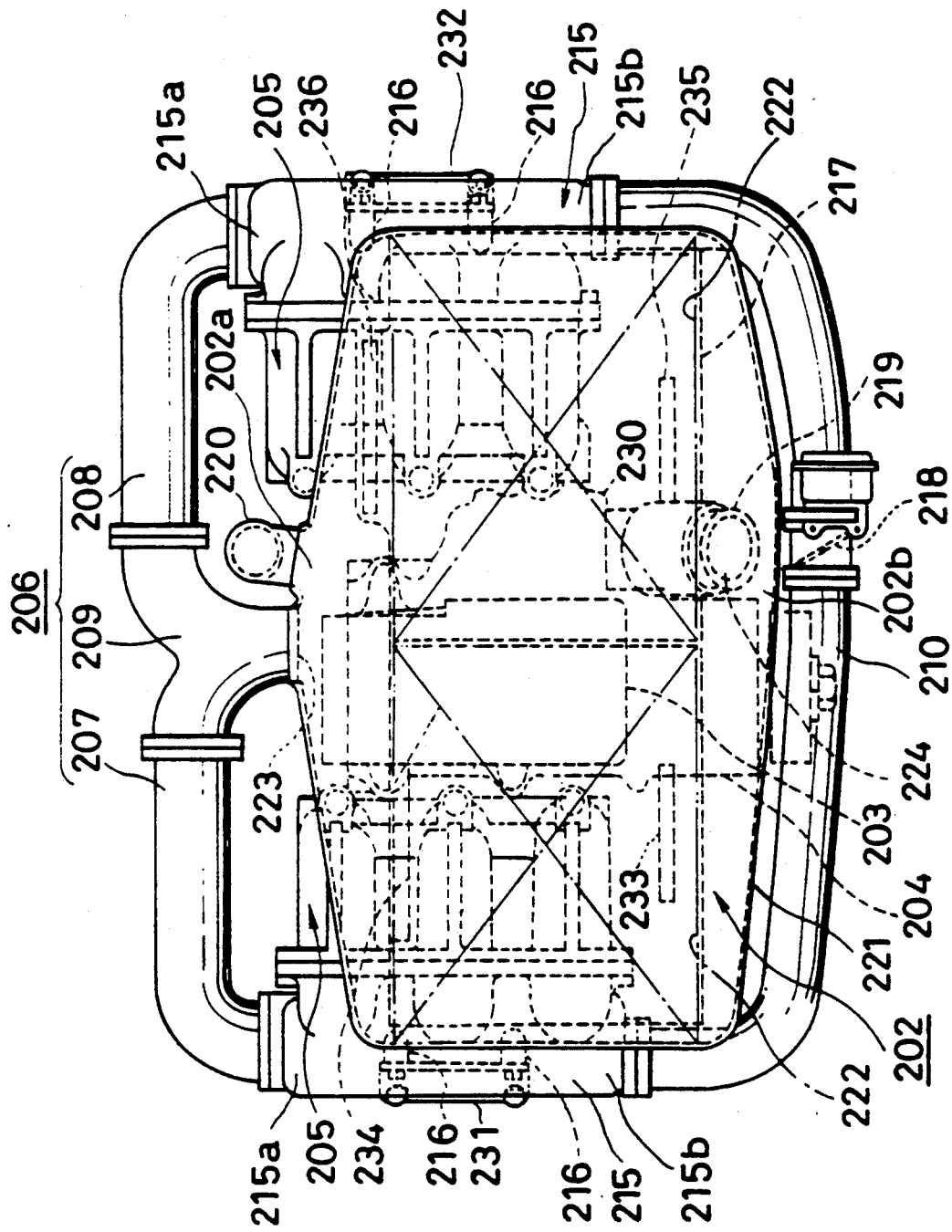
Figure 21:
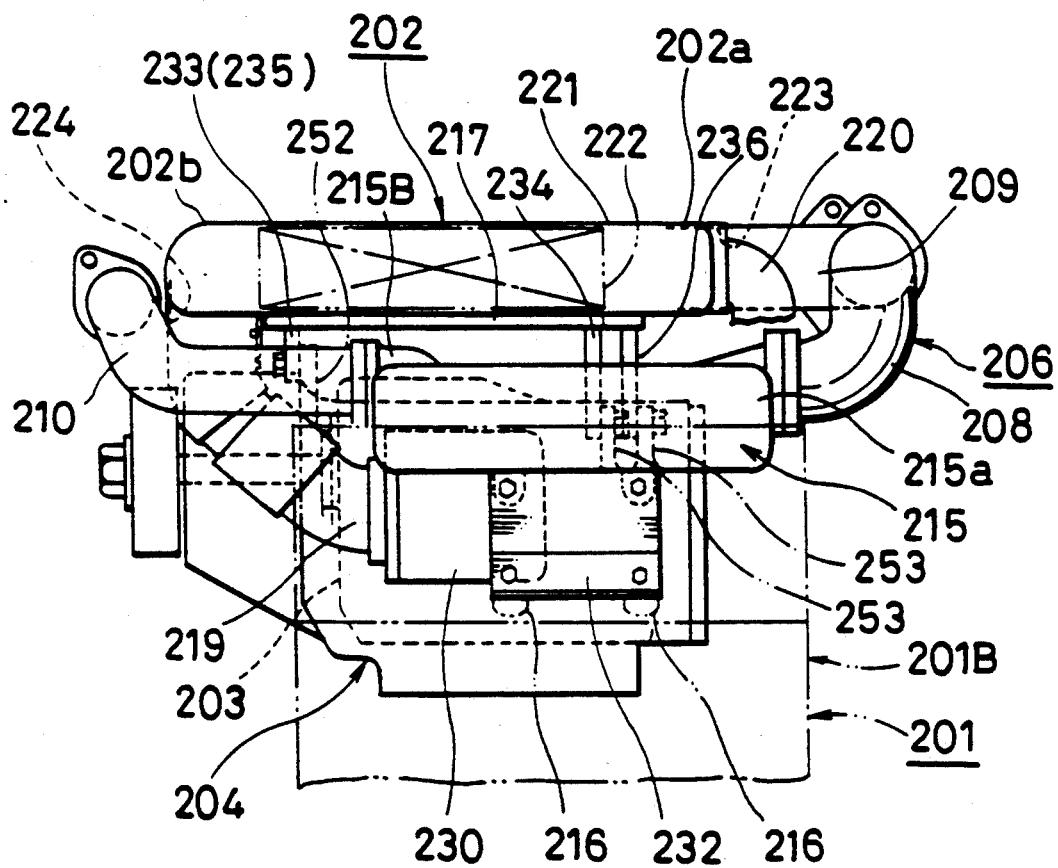

Another Structure of Intake System (FIGS. 19-21)

FIGS. 19 to 21, inclusive, relate to a preferred embodiment of the structure of the intake system at the portion close to the surge tank, which is suitable particularly for the internal combustion engine as shown in FIGS. 1 to 3, inclusive. The embodiment of the intake system as shown in FIGS. 19 to 21, inclusive, is so adapted as to enhance the rigidity of the intake system as a whole for supporting the main body 1 of the engine by effectively making use of each of the members for structuring the intake system and making the structure of the intake system compact. Further, the intake system according to this embodiment can contribute to reduction in noises from the engine by suppressing the vibration of the surge tank that otherwise is increased by the vibration of the supercharger.

As shown in FIGS. 19 to 21, inclusive, a V-type internal combustion engine 201 has a pair of left-hand and right-hand bank sections 201A and 201B, which are disposed inclining at a given angle in a V-shaped arrangement on the upper portion of a cylinder block 211 and, further, it has cam carriers 213 and 213 disposed on the respective bank sections 201A and 201B.

Between the left-hand and right-hand bank sections 201A and 201B of the engine 201 is interposed a V-shaped concave section 214 having a predetermined size and extending in the axial direction of the output shaft of the engine. In the V-shaped concave section 214 is mounted a supercharger 203 of a type drivable by the engine, and the supercharger 203 is arranged in a covering 204 which comprises a lower covering section 241 and an upper covering section 242; the lower covering section 241 being of a nearly box shape having an opening in its upper surface and being fastened and fixed to an upper surface 211a of the cylinder block 211; and the upper covering section 242 being inserted from the above into and fixed to the end of the opening formed in the lower covering section 241.

Further, surge tanks 215 are mounted above the left-hand and right-hand bank sections 201A and 201B, extending in the direction in which the cylinders are disposed. Each of the surge tanks 215 is connected with and supported by the side section of each of the left-hand and right-hand bank sections 201A and 201B through each of intake manifolds 205 connected to the side sections of the surge tanks 215 respectively. Further, each of the surge tanks 215 is supported, respectively, by the left-hand and right-hand bank sections 201a and 201B through side brackets 232 extending between a pair of left-hand and right-hand mounting boss sections 216 formed underneath the surge tanks and side boss sections 251 formed on the left-hand and right-hand bank sections 201A and 201B. The side bracket 232 is of a plate form having a predetermined thickness and having a high degree of rigidity, whose plane is disposed extending in the axial direction of the corresponding surge tank 215, i.e. in the axial direction of the output shaft of the engine, thereby enhancing the rigidity in the direction of the output shaft of the engine.

One end 215a of the left-hand surge tank 215 is connected with one end 215a of the right-hand surge tank 215 through an intake tube 206 as will be described hereinafter. On the other hand, the other end 215b of the left-hand surge tank 215 is connected with the other end 215b of the right-hand surge tank 215 through a resonant tube 210 with a control valve 218 mounted therein in its intermediate position. Each of the intake tube 206 and the resonant tube 210 is of a frame body in a nearly rectangular section. The control valve 218 is so arranged as to open and close the resonant tube 210 in accordance with the running state of the engine, in order to improve the efficiency in filling with the intake air due to the dynamic effect of the intake air.

Above the V-shaped concave section 214 is mounted an intercooler 202 in a nearly rectangular and flat section in such a state that it extends astride and between the left-hand and right-hand bank sections 201A and 201B. The intercooler 202 is configured in such a manner that a pair of cores 222 are arranged in a juxtaposed state in the direction perpendicular to the axial direction of the output shaft of the engine within a casing 221 made of an aluminium alloy, and the intercooler 202 is provided with an outlet 223 for discharging the intake air in its approximately transversely middle position at the side of one end portion 202a of the casing 221, extending in the axial direction of the output shaft of the engine, and with an inlet 224 for introducing the intake air at the bottom side of the other end portion 202b of the casing 221. At the bottom side of the casing 221 of the intercooler 202 is mounted a base plate 217 made of a steel and having a predetermined area. The base plate 217 is provided on its bottom surface with two front left-hand and right-hand projecting brackets 233 and 235 and two rear left-hand and right-hand projecting brackets 234 and 236 at its front left-hand and right-hand and rear left-hand and right-hand portions, respectively, and the intercooler 202 is supported with and fixed to the engine 201 by fastening the brackets 233 to 236, inclusive, to front boss sections 252 as well as rear boss sections 253, each formed in the left-hand and right-hand bank sections 201A and 201B, respectively. The brackets 233 to 236, inclusive, each formed so as to project from the bottom surface of the base plate 217 of the intercooler 202, are disposed so as for each of their lengthwise plane to extend in the direction perpendicular to the axial direction of the output shaft of the engine, i.e. in the direction of the sectionally V-shaped angles of the bank sections. The provision of the brackets 233 to 236, inclusive, serves as enhancing the rigidity of the engine in the direction bridging the left-hand and right-hand bank sections 201A and 201B.

The inlet 224 of the intercooler 202 for introducing the intake air is communicated through an outlet tube 219 with the outlet 230 of the supercharger 203 for discharging the supercharged air, and the outlet 223 for discharging the intake air is communicated with each of the surge tanks 215 and 215 through the intake tube 206 in a manner as will be described hereinafter.

In FIGS. 20 and 21, reference numeral 220 denotes a bypass tube for communicating an upstream position of the supercharger 203 directly with the position in the vicinity of the outlet 223 for discharging the intake air. The bypass tube 220 is provided in its intermediate position with a control valve (not shown) for performing the control of the bypass of the intake air. When the control valve is opened, the intake air is introduced directly into each of the surge tanks 215 by bypassing both of the supercharger 203 and the intercooler 202.

As specifically shown in FIG. 20, the intake tube 206 comprises a two-branch tube section 209 connected to the intake outlet 223 of the intercooler 202, a first intake branch tube 207 extending from one of the branch sections of the two-branch tube section 209 up to the one end portion 215a of the surge tank 215 on the side of the first bank section 201A, and a second intake branch tube 208 extending from the other branch section of the two-branch tube section 209 up to the other end portion 215a of the surge tank 215 on the side of the second bank section 201B. The supercharged air (or natural intake air, in some cases) discharged from the intake outlet 223 of the intercooler 202 is divided into the first and second intake branch tubes 207 and 208 and then fed to the first and second bank sections 201A and 201B, respectively.

A description will now be made of the action and the effect of the intake device having the configuration as described hereinabove.

When the engine 201 starts up, the intake air whose pressure is elevated to an appropriate level by the supercharger 203 is introduced from the intake inlet 224 into the intercooler 202, followed by cooling the supercharged air with the intercooler 202 and supplying the resulting air to the surge tanks 215 of the respective bank sections 201A and 201B through the intake branch tubes 207 and 208 of the intake tube 206 from the intake outlet 223, thereby allowing the resulting air to be inhaled into each of the cylinders from the intake manifold 205.

As the supercharger 203 is covered with the covering 204, the noises produced by operating the supercharger 203 can be prevented to a great extent from leaking outside from the inside, thereby realizing a silent drive. This arrangement can serve as maintaining the supercharging performance at a favorable level because it can further prevent the supercharger 203 from being damaged due to transformation caused by the heat produced by the operation of the engine and, as a consequence, the rotatability of a rotator (not shown) is not impaired. Further, the vibration produced by the operation of the supercharger 203 is transmitted to the surge tanks 215, thereby accelerating the vibration of the surge tanks 215. It should be noted, however, that in the embodiment according to the present invention, the structure of the intercooler 202 and the surge tank 215 is so designed as to reduce the accelerated vibration to such an extent as causing no or little actual influence.

For the V-type engine having the configuration as described hereinabove, the left-hand and right-hand bank sections 201A and 201B are arranged in a V-shaped manner in the direction of the angle at which they are inclined in a V-shaped arrangement in section, i.e. in the direction in which the inner wall surface of the left-hand bank section 201A faces the inner wall surface of the right-hand bank section 201B. It should be noted herein that this direction is referred to merely as "the angular direction" for brevity of explanation unless otherwise stated hereinafter. Hence, a sufficient degree of rigidity in the angular direction should be ensured, preferably without increasing the weight of the body of the engine. In the embodiment according to the present invention, the intercooler 202 is configured in such a manner that it extends astride and between the left-hand and right-hand bank sections 201A and 201B and it is fixed to them and that the brackets 233 to 236, inclusive, for fixing the intercooler 202 to the bank sections 201A and 201B are arranged so as to provide rigidity in the angular direction. This arrangement can increase the rigidity of the bank sections 201A and 201B in the angular direction by the intercooler 202 and the base plate 217 on which the brackets are provided. At the same time, this arrangement can increase the rigidity of the intercooler 202 itself, particularly in the angular direction, for supporting the body of the engine 201.

On the other hand, the surge tanks 215 are arranged in a nearly rectangular frame body structure together with the intake tube 206 and the resonant tube 210, the intake tube 206 connecting the one end portions 215a of the surge tanks 215 to each other and the resonant tube 210 connecting the other end portions 215b thereof to each other. The surge tanks 215 in the frame body structure has an increased degree of rigidity as a whole. Further, the surge tanks 215 have the increased degree of rigidity, particularly in the angular direction, because they are connected through the intake tube 206 to the intercooler 202 which in turn is connected to the body of the engine with the increased rigidity. In addition, each of the surge tanks 215 and 215 is connected directly to the bank sections 201A and 201B through the side brackets so configured as to provide rigidity in the direction of the output shaft of the engine. A combination of the arrangements as described hereinabove can greatly increase the rigidity for supporting the surge tanks 215 and 215 with the body of the engine 201.

Furthermore, as the outlet 223 of the intercooler 202 for discharging the intake air is disposed in the nearly middle position in the axial direction of the output shaft of the engine between the one end portions 215a of the respective surge tanks 215, the intake tube 206 can be arranged in a nearly straight structure. This arrangement can contribute to a compact and lightweight structure of the body of the engine as a whole. In addition, the structure of the intake tube 206 can provide a favorable balance of the weight of the intercooler 202 in the left and right directions, particularly in the angular direction, because the two-branch intake tube section 209 connected to the intake outlet 223 of the intercooler 202 is located in the nearly middle position between the left-hand and right-hand surge tanks 215. As a consequence, the vibration of the intake system can be suppressed as a whole and the favorable performance for supporting the intake system can be maintained.

In summary, the structure of the intake system in whole, containing the surge tanks 215, the intercooler 202, the intake tube 206 and the resonant tube 210, can contribute to an increase in the rigidity for supporting the body of the engine 201. Hence, each of the members for structuring the intake system does not vibrate or vibrates only a little due to the increased rigidity of the intake system even if the vibration produced by running the supercharger 203 would accelerate the vibration of the engine as a whole, thereby maintaining a favorable degree of strength of each of the structuring members for supporting the body of the engine and preventing the noises from occurring in association with the vibration of each of the structuring members.

In addition, the brackets 233 to 236, inclusive, on the side of the intercooler are configured in such a manner that each of their plate planes extends in the angular direction, while the brackets 231 and 232 are configured in such a manner that each of their plate planes extends in the direction of the output shaft of the engine. The arrangement for the brackets 233 to 236, inclusive, allows the intercooler 202 to be mounted on the basis of the angular direction, while the arrangement for the brackets 231 and 232 allows the surge tanks 215 to be mounted on the basis of the direction of the output shaft of the engine. This can improve the mounting performance of the intercooler 202 and the surge tanks 215 because they can be mounted separately; on the contrary, when the lengthwise directions of the plate planes of the brackets are set to extend all in the same directions, the mounting performance is impaired because the intercooler 202 and the surge tanks 215, should be mounted at the same time on the basis of the same directions.

For a comparative purpose, a description will be made of the relationship of the structuring elements as shown in FIGS. 19 to 21, inclusive, with the structuring elements as shown in FIGS. 1 to 3, inclusive, as follows: the left-hand and right-hand bank sections 201A and 201B corresponding to the left-hand and right-hand bank portions 2L and 2R; the left-hand and right-hand surge tank 215 and 215 corresponding to the left-hand and right-hand surge tanks 34L and 34R; the intercooler 202 corresponding to the intercooler 33; and the resonant tube 210 corresponding to the connecting tube 50, respectively.

Although the embodiments according to the present invention have been described hereinabove, for example, the supercharger may be a turbocharger and a map as indicated by FIG. 5 or FIG. 13 may be prepared and stored in advance in a ROM of the control unit U in setting the supercharging region where the intake air is to be supercharged, thereby allowing the current running state of the engine to be collated with the map and enabling, for example, the air-fuel ratio to be shifted and the control of the recirculation of exhaust gases to be shifted. It can further be noted as a matter of course that the supercharging region may be determined, for example, on the basis of the output of the sensor 83 for sensing the pressure of the intake air.

The present invention is not intended in any manner to be limited to the embodiments as described hereinabove, and it is to be understood that any variations or modifications made so as not to deviate from the concepts of the present invention are interpreted as being encompassed within the spirit and the scope of the present invention.

What is claimed is:

1. A supercharged internal combustion engine comprising:
   a throttle valve for controlling an amount of intake air introduced into a combustion chamber of the engine;
   a supercharger for supercharging intake air;
   a recirculation passage for recirculating a portion of exhaust gases discharged from the engine into an intake system;
   a control valve for controlling an amount of the exhaust gases to be recirculated from the recirculation passage;
   a first control means for controlling an air-fuel ratio of a mixed fuel to be made a lead air-fuel ratio which is leaner than a stoichiometric air-fuel ratio when the supercharger exists in a supercharging region; and
   a second control means for controlling the control valve so as to recirculate the exhaust gases into the intake system at the time of the lean air-fuel ratio in the supercharging region.

2. A supercharged internal combustion engine as claimed in claim 1, wherein the lean air-fuel ratio is in the range of from A/F=15 to A/F=16.

3. A supercharged internal combustion engine as claimed in claim 1, further comprising means for decreasing the temperature of the exhaust gases to be recirculated into the intake system at the time of the lean air-fuel ratio.

4. A supercharged internal combustion engine as claimed in claim 3, wherein:
   the recirculation passage has an outer passage disposed outside the engine;
   the outer passage is composed of a long tube member; and
   the exhaust gases to be recirculated are cooled by radiation of heat from the outer passage.

5. A supercharged internal combustion engine as claimed in claim 3, wherein:
   the recirculation passage is connected to a first cooler means; and
   the exhaust gases to be recirculated are cooled by the first cooler means.

6. A supercharged internal combustion engine as claimed in claim 3, wherein:
   a second cooler means is connected to the intake system on the downstream side of the supercharger;
   a downstream end of the recirculation passage has an opening at the intake system on the upstream side of the second cooler means; and
   the exhaust gases to be recirculated are cooled by the second cooler means.

7. A supercharged internal combustion engine as claimed in claim 3, wherein:
   a first cooler means is connected to the recirculation passage;
   a second cooler means is connected to the intake system on the downstream side of the supercharger; and
   a downstream end of the recirculation passage has an opening at the intake system on the upstream side of the second cooler means; and
   the exhaust gases to be recirculated are cooled by the first cooler means and the second cooler means.

8. A supercharged internal combustion engine as claimed in claim 1, wherein the supercharging region, where the air-fuel ratio is the lean air-fuel ration, is a region where the number of rotations of the engine is high.

9. A supercharged internal combustion engine as claimed in claim 8, wherein the supercharging region where the air-fuel ratio is the lean air-fuel ratio is a region where the number of rotations of the engine is low and the load of the engine is medium.

10. A supercharged internal combustion engine as claimed in claim 8, wherein the air-fuel ratio is made a stoichiometric air-fuel ratio or a rich air-fuel ratio where the air-fuel ratio is richer than the stoichiometric ratio at the time when the number of rotation of the engine is low and the load of the engine is high.

11. A supercharged internal combustion engine as claimed in claim 10, wherein the air-fuel ratio is made stoichiometric in a region where the number of rotation of the engine is low and the load of the engine is low.

12. A supercharged internal combustion engine as claimed in claim 10, wherein a rate of the exhaust gases to be recirculated in temporarily increased at the time of shifting to the supercharging region where the air-fuel ratio is made the lead air-fuel ratio from a region where the air-fuel ratio is at least one of the stoichiometric air-fuel ratio and the rich air-fuel ratio.

13. A supercharged internal combustion engine as claimed in claim 10, wherein the recirculation of the exhaust gases into the intake system is suspended during a period of a low rotation and a high load of the engine.

14. A supercharged internal combustion engine as claimed in claim 13, wherein the exhaust gases are recirculated to the intake system prior to shifting from the supercharging region where the air-fuel ratio is at least one of the stoichiometric air-fuel ratio and the rich air-fuel ratio to the region where the air-fuel ratio is the lean air-fuel ratio 15. A supercharged internal combustion engine as claimed in claim 10, wherein the rich air-fuel ratio is made an A/F ratio of approximately 13 when the air-fuel ratio is made the rich air-fuel ratio when the number of rotation of the engine is low and the load of the engine is high.

16. A supercharged internal combustion engine as claimed in claim 1, wherein the temperature is a mechanically driven supercharger.

17. A supercharged internal combustion engine as claimed in claim 1, wherein:
the air-fuel ratio is made richer than stoichiometric when at least the throttle valve is full open; and
a rate of the exhaust gases to be recirculated is increased, prior to when the air-fuel ratio is shifted to the supercharging region where the air-fuel ratio is the lean air-fuel ratio.

18. A supercharged internal combustion engine as claimed in claim 1, further comprising:
a storage means for storing information indicative of the supercharging region where the air-fuel ratio is made a lean air-fuel ratio by using a running state of the engine as a parameter; and
a detection means for detecting the running state of the engine;
wherein the air-fuel ratio is made leaner and the exhaust gases are recirculated into the intake system when the current running state of the engine detected by the detection means indicates that the engine is operating in the supercharging region.

19. A supercharged internal combustion engine as claimed in claim 18, wherein the engine is made leaner based on the number of rotations of the engine and the load of the engine.

20. A supercharged internal combustion engine as claimed in claim 1, wherein:
an amount of exhaust gases to be recirculated into the intake system is set separately from the supercharging region where the air-fuel ratio is the lean air-fuel ratio; and
a rate of the exhaust gases to be recirculated is temporarily increased at the time of a shift between the lean air-fuel ratio and the rich air-fuel ratio.

21. A supercharged internal combustion engine as claimed in claim 20, wherein the rate of the exhaust gases to be recirculated is temporarily increased prior to the shift.

22. A supercharged internal combustion engine as claimed in claim 21, wherein the rate of the exhaust gases to be recirculated is temporarily increased for a predetermined period of time after the shift.

23. A supercharged internal combustion engine as claimed in claim 22, wherein the rate of recirculation of the exhaust gases to be temporarily increased is increased gradually and then decreased gradually to a predetermined rate.

24. A supercharged internal combustion engine as claimed in claim 1, wherein:
the exhaust gases are recirculated into the intake system prior to a shift from a rich air-fuel ratio to the lean air-fuel ratio.

25. A supercharged internal combustion engine comprising:
a throttle valve for controlling an amount of intake air introduced into a combustion chamber of the engine;
a supercharger for supercharging intake air;
a recirculation passage for recirculating a portion of exhaust gases discharged from the engine into an intake system;
a control valve for controlling an amount of the exhaust gases to be recirculated form the recirculation passage;
a first control means for controlling an air-fuel ratio of a mixed fuel to make the air-fuel ratio a lean air-fuel ratio which is leaner than a stoichiometric air-fuel ratio when the supercharger exists in a supercharging region which causes pressure of the intake air to increase its temperature higher than ambient temperature; and
a second control means for controlling the control valve so as to recirculate the exhaust gases into the intake system during a time of the lean air-fuel ratio in the supercharging region.

26. A supercharged internal combustion engine as claimed in claim 25, further comprising:
means from decreasing the temperature of the exhaust gases, to be recirculated to the intake system at the lean air-fuel ratio during a high load of the engine and for increasing the temperature of the exhaust gases during a low load of the engine;
the recirculation passage comprises a first recirculation passage to which no cooler means is connected and a second recirculation passage to which a first cooler means is connected; and
the exhaust gases are recirculated to the intake system only from the first recirculation passage at the time of the low load of engine and only from the second recirculation passage at the time of the high load of the engine.

27. A supercharged internal combustion engine as claimed in claim 25, further comprising means for decreasing the temperature of the exhaust gases to be recirculated to the intake system during high load of the engine and for increasing the temperature of the exhaust gases during low load of the engine.

28. A supercharged internal combustion engine as claimed in claim 27, wherein:
the recirculation passage comprises a first recirculation passage to which no cooler means is connected and a second recirculation passage to which the first cooler means is connected; and
the exhaust gases are recirculated to the intake system only from the first recirculation passage at the time of a low load of the engine and only from the second recirculation passage at the time of a high load of the engine.

29. A supercharged internal combustion engine as claimed in claim 28, wherein the exhaust gases are recirculated to the intake system from both of the first recirculation passage and the second recirculation passage at the time of a medium load of the engine, which exists in an intermediate position between the high load of the engine and the low load of the engine.

30. A supercharged internal combustion engine comprising:

a throttle valve for controlling an amount of intake air introduced into a combustion chamber of the engine;

a supercharger for supercharging intake air;

a recirculation passage for recirculating a portion of exhaust gases discharged from the engine into an intake system;

a control valve for controlling an amount of the exhaust gases to be recirculated from the recirculation passage;

a first control means for controlling an air-fuel ratio of a mixed fuel to make the air-fuel ratio a lean air-fuel ratio which is leaner than a stoichiometric air-fuel ratio when the supercharger exists in a supercharging region where an intake pressure detecting degree of pressure; and a second control means for controlling the control valve so as to recirculate the exhaust gases into an intake system at the time of the lean air-fuel ratio in the supercharging region.

31. A supercharged internal combustion engine as claimed in claim 30, further comprising:

means for decreasing the temperature of the exhaust gases, to be recirculated to the intake system at the lean air-fuel ratio during a high load of the engine and for increasing the temperature of the exhaust gases during a low load of the engine;

the recirculation passage comprises a first recirculation passage to which no cooler means is connected and a second recirculation passage to which a first cooler means is connected; and the exhaust gases are recirculated to the intake system only from the first recirculation passage at the time of the low load of engine and only from the second recirculation passage at the time of the high load of the engine.

32. A supercharged internal combustion engine comprising:

a supercharger for supercharging intake air;

a recirculation passage for recirculating a portion of exhaust gases discharged from the engine into an intake system upstream of the supercharger;

a control valve for controlling an amount of the exhaust gases to be recirculated from the recirculation passage;

a first control means for controlling an air-fuel ratio of a mixed fuel to make the air-fuel ratio a lean air-fuel ratio which is leaner than a stoichiometric air-fuel ratio when the supercharger exists in a supercharging region which includes a maximum load condition; and a second control means for controlling the control valve so as to recirculate the exhaust gases into an intake system at the time of the lean air-fuel ratio in the supercharging region.

33. A supercharged internal combustion engine as claimed in claim 32, further comprising:

means for decreasing the temperature of the exhaust gases, to be recirculated to the intake system at the lean air-fuel ratio during a high load of the engine and for increasing the temperature of the exhaust gases during a low load of the engine;

a recirculation passage comprising a first recirculation passage to which no cooler means is connected and a second recirculation passage to which a first cooler means is connected; and the exhaust gases are recirculated to the intake system only from the first recirculation passage at the time of the low load of the engine and only from the second recirculation passage at the time of the high load of the engine.

34. A supercharged internal combustion engine comprising:

a supercharger for supercharging intake air;

a recirculation passage for recirculating a portion of exhaust gases discharged from the engine into an intake system upstream of the supercharger;

a control valve for controlling an amount of the exhaust gases to be recirculated from the recirculation passage;

a first control means for controlling an air-fuel ratio of a mixed fuel to make the air-fuel ratio a lean air-fuel ratio which is leaner than a stoichiometric air-fuel ratio when the supercharger exists in a supercharging region where the supercharger can demonstrate a substantial supercharging effect that causes pressure of the intake air to increase its temperature higher than ambient temperature; and a second control means for controlling the control valve so as to recirculate the exhaust gases into an intake system at the time of the lean air-fuel ratio in the supercharging region.

35. A supercharged internal combustion engine as claimed in claim 34, further comprising:

means for decreasing the temperature of the exhaust gases, to be recirculated to the intake system at the lean air-fuel ratio during a high load of the engine and for increasing the temperature of the exhaust gases during a low load of the engine;

the recirculation passage comprising a first recirculation passage to which no cooler means is connected and a second recirculation passage to which the first cooler means is connected; and the exhaust gases are recirculated to the intake system only from the first recirculation passage at the time of the low load of engine and only from the second recirculation passage at the time of the high load of the engine.

* * * * *